United States Patent
Yamada et al.

(10) Patent No.: US 6,772,588 B2
(45) Date of Patent: Aug. 10, 2004

(54) INTAKE AND EXHAUST CONTROL SYSTEMS FOR ENGINE

(75) Inventors: Hajime Yamada, Saitama (JP); Toshihiko Suda, Saitama (JP); Tetsuya Nakayasu, Saitama (JP); Noriyoshi Tsutsui, Saitama (JP); Shigeru Kodaira, Saitama (JP); Kenjiro Saito, Saitama (JP); Mitsuo Kusa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/090,777

(22) Filed: Mar. 6, 2002

(65) Prior Publication Data

US 2002/0112470 A1 Aug. 22, 2002

(30) Foreign Application Priority Data

Sep. 3, 1999 (JP) .......................................... 11-250813
Mar. 31, 2000 (JP) ....................................... 2000-101330

(51) Int. Cl.[7] .............................................. F02B 27/02
(52) U.S. Cl. ............................. 60/313; 60/305; 60/312; 60/324
(58) Field of Search ........................ 60/312, 313, 314, 60/305, 323, 324

(56) References Cited

U.S. PATENT DOCUMENTS

| | | | |
|---|---|---|---|
| 2,297,235 A | 9/1942 | Muller | |
| 2,621,472 A | 12/1952 | Udale et al. | |
| 3,094,836 A | 6/1963 | Powell et al. | |
| 4,785,626 A | * 11/1988 | Shiraishi | 60/313 |
| 4,795,420 A | 1/1989 | Sakurai et al. | |
| 4,817,374 A | * 4/1989 | Kitta | 60/313 |
| 4,840,029 A | * 6/1989 | Sakurai et al. | 60/313 |
| 4,860,538 A | * 8/1989 | Takeuchi | 60/313 |
| 4,869,063 A | * 9/1989 | Sakurai et al. | 60/313 |
| 4,939,898 A | 7/1990 | Ichimura et al. | |
| 5,560,201 A | * 10/1996 | Fujishita et al. | 60/279 |
| 5,655,362 A | * 8/1997 | Kawajiri et al. | 60/276 |
| 5,701,735 A | * 12/1997 | Kawaguchi | 60/274 |

FOREIGN PATENT DOCUMENTS

| | | |
|---|---|---|
| JP | A58/155270 | 9/1983 |
| JP | 60/147536 A | 8/1985 |
| JP | 61/218720 A | 9/1986 |
| JP | 20/075721 A | 3/1990 |
| JP | 02/207132 A | 8/1990 |
| JP | 03/009026 A | 1/1991 |
| JP | A6 76780 | 9/1994 |

* cited by examiner

Primary Examiner—Binh Q. Tran
(74) Attorney, Agent, or Firm—Birch, Stewart, Kolasch & Birch, LLP

(57) ABSTRACT

The intake and exhaust control systems are operable in varying modes, according to the engine speed, by a single actuator. The intake control system includes an intake valve that allows a variable amount of air into an air cleaner depending on vehicle speed. The exhaust control system includes an exhaust control valve, and a primary and a secondary exhaust purifying system located downstream of the exhaust control valve. The flow into the exhaust purifying systems may also be controlled according to engine speed.

8 Claims, 20 Drawing Sheets

INTAKE AND EXHAUST CONTROL SYSTEMS FOR ENGINE

BACKGROUND OF THE INVENTION

1. Field of the Invention

The present invention relates to intake and exhaust control systems for an engine, in which an intake control valve for changing an intake mode in accordance with an operational state of an engine is provided in an intake system of the engine, and an exhaust control valve for changing an exhaust mode in accordance with an operational state of the engine is provided in an exhaust system of the engine.

2. Background Art

A conventional intake control system operates an intake system for an engine and has an intake control valve operated between a first intake control position, at which it gives a low speed side compatible function to the intake system, and a second intake control position, at which it gives a high speed side compatible function to the intake system. Such a conventional system is disclosed in Japanese Patent Laid-open No. Sho 58-155270.

A conventional exhaust control system operates an exhaust system and has an exhaust control valve operated between a first exhaust control position, at which it gives a low speed side compatible function to the exhaust system, and a second exhaust control position, at which it gives a high speed side compatible function to the exhaust system. This type of conventional system is disclosed in Japanese Patent Publication No. Hei 6-76780.

If the above-described intake control valve and exhaust control valve are provided in an intake system and an exhaust system of the same engine, the output performance in a wide rotational range of the engine can be further improved. However, because the control valves are individually driven by separate actuators, the number of parts is increased, increasing cost.

A need therefore exists for an intake and an exhaust control system capable of improving the performance of the engine in both low and high speed rotational ranges.

SUMMARY OF THE INVENTION

The present invention overcomes the shortcomings of the conventional art and achieves other advantages not realized by the conventional art.

According to one embodiment of the present invention, intake and exhaust control systems for an engine are provided in which an intake control valve for changing an intake mode in accordance with an operational state of an engine is provided in an intake system of the engine, and an exhaust control valve for changing an exhaust mode in accordance with an operational state of the engine is provided in an exhaust system of the engine. The intake control valve and the exhaust control valve are driven by a common actuator.

According to this aspect of the invention, it is possible to obtain a desired output performance of the engine, irrespective of a change in the operational state of the engine, by operating the intake control valve and the exhaust control valve in accordance with the operational state of the engine. The intake valve and the exhaust control valve can be operated by the common actuator.

Further, since the intake control valve and the exhaust control valve are driven by the common actuator, it is possible to simplify the configuration of the drive system, and thereby improve the engine performance. The cost and weight of the drive system are also reduced.

According to a second aspect of the present invention, the intake control valve is operated between a first intake control position, at which the intake control valve gives a low speed side compatible function to the intake system, and a second intake control position, at which the intake control valve gives a high speed side compatible function to the intake system. The exhaust control valve is operated between a first exhaust control position, at which the exhaust control valve gives a low speed side compatible function to the exhaust system, and a second exhaust control position, at which the exhaust control valve gives a high speed side compatible function to the exhaust system.

The first exhaust control position and the second exhaust control position of the exhaust control valve are equivalent to a medium speed control position and a high speed control position of a valve body of an exhaust control valve.

According to the second aspect of the invention, since at the low speed rotational range of the engine, the intake control valve, and the exhaust control valve are held at the first intake control position and the first exhaust control position by the actuator, respectively, it is possible to give the low speed side compatible function to both the intake system and the exhaust system. This enhances the low speed side output performance of the engine.

When the rotational state of the engine is shifted to the high speed rotational range, since the intake control valve and the exhaust control valve are moved to the second intake control position and the second exhaust control position by the actuator, respectively, it is possible to give the high speed side compatible function to both the intake system and the exhaust system. This enhances the high speed side output performance of the engine.

According to a third aspect of the present invention, a lost motion mechanism for absorbing a difference in operational amount between the intake control valve and the exhaust control valve is provided between the actuator and the intake control valve, or between the actuator and the exhaust control valve. In the third aspect, even when there is a large difference between the operational amounts of the intake control valve and the exhaust control valve, such a difference can be absorbed by the lost motion mechanism, so that both the control valves can be certainly operated by the common actuator.

According to a fourth aspect of the present invention, the exhaust control valve may include a common valve housing interposed on the way of a first exhaust pipe, and a second exhaust pipe connected to cylinders having differing ignition timing. A valve body is mounted in the valve housing and switchably turned between a low speed control position, a medium speed control position, and a high speed control position. At the low speed control position of the valve body, the first exhaust pipe is communicated to the second exhaust pipe, and the first exhaust pipe is closed on the downstream side of the communicated portion. At the medium speed control position, the first exhaust pipe and the second exhaust pipe individually allow exhaust gases to pass therethrough. At the high speed control position, the first exhaust pipe and the second exhaust pipe individually allow exhaust gases to pass therethrough, and an intermediate portion of the first exhaust pipe is communicated to an intermediate portion of the second exhaust pipe.

According to the fourth aspect, exhaust gas flowing in the first exhaust pipe is curved, on the way, onto the second exhaust pipe side by controlling the valve body at the low speed control position, in order to increase the exhaust resistance. It is therefore possible to apply an exhaust pressure suitable for the low speed rotational range to the engine, and hence to improve the low speed output performance by suppressing the blow-by of a new air from each cylinder to the exhaust system during the valve overlapping period. The effective pipe length of each of the first and second exhaust pipes is set at the maximum length matched to the medium speed operational range of the engine by controlling the valve body at the medium speed control position. This enhances the volume efficiency by making use of an exhaust inertia effect and/or an exhaust pulsation effect, thereby increasing the medium speed output performance of the engine. Further, the effective pipe length of each of the first and second exhaust pipes is set at the minimum length matched to the high speed operational range of the engine by controlling the valve body at the high speed control position. This enhances the volume efficiency by making use of the exhaust inertia effect and/or the exhaust pulsation effect, thereby increasing the high speed output performance of the engine.

According to a fifth aspect of the present invention, the valve body is supported in the valve housing so as to be turned between the low speed control position, the medium speed control position, and the high speed control position. The valve body has a through-hole crossing the axial line of the valve body, and a communication hole for opening one side surface of the through-hole in the radial direction of the valve body. At the low speed control position of the valve body, the communication hole and the through-hole are concerned with the mutual communication of the first exhaust pipe and the second exhaust pipe, and a valve wall, opposed to the communication hole, of the valve body is concerned with the closing of the downstream side of the first exhaust pipe. At the medium control position, the through-hole is matched to the pipe line of the first exhaust pipe, and the valve wall is concerned with the blocking between the first exhaust pipe and the second exhaust pipe. At the high speed control position, the through-hole is matched to the pipe line of the first exhaust pipe, and the communication hole is concerned with the communication between the first exhaust pipe and the second exhaust pipe.

According to the fifth aspect, it is possible to equalize the cross-section of the pipe line of each exhaust pipe over the effective pipe length matched to each operational range of the engine irrespective of the presence of the valve body. Effective exhaust inertia effect and/or exhaust pulsation effect that is matched to each operational range may therefore be obtained. In particular, when the valve body is controlled at the medium speed control position, it is possible to equalize the cross-section of the pipe line of each exhaust pipe over the entire length, and hence to significantly obtain the above-described effect and improve the medium speed output performance of the engine.

According to a sixth aspect of the present invention, of the first exhaust pipe and the second exhaust pipe on the downstream side from the valve housing, only the second exhaust pipe is connected to a primary exhaust purifying system. The first exhaust pipe and the second exhaust pipe are connected to an exhaust collection pipe on the downstream side from the primary exhaust purifying system. A secondary exhaust purifying system is provided in the exhaust collection pipe.

According to the sixth aspect, in the low speed operational range of the engine, in which the flow rate of exhaust gas is relatively small, the valve body is controlled at the low speed control position. In this case, all of the exhaust gas having passed through the valve housing can be sequentially introduced to the primary and secondary purifying systems, thereby purifying the exhaust gas. The primary exhaust purifying system can be heated to an activation temperature at an early stage, and the entire cost of the exhaust purifying systems can be reduced because an exhaust purifying system is not provided on the first exhaust pipe side. In the medium or high speed operational range of the engine, the valve body is controlled at the medium or high speed control position. In this case, the exhaust gas having passed through the first exhaust pipe does not pass through the primary exhaust purifying system; however, in such a state, the flow rate of the exhaust gas becomes relatively large and all of the exhaust gas passes through the secondary exhaust purifying system. Therefore, the purifying function of the secondary exhaust purifying system is sufficiently enhanced by the exhaust heat of the exhaust gas, and the reaction heat, and thereby all the exhaust gas can be effectively purified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
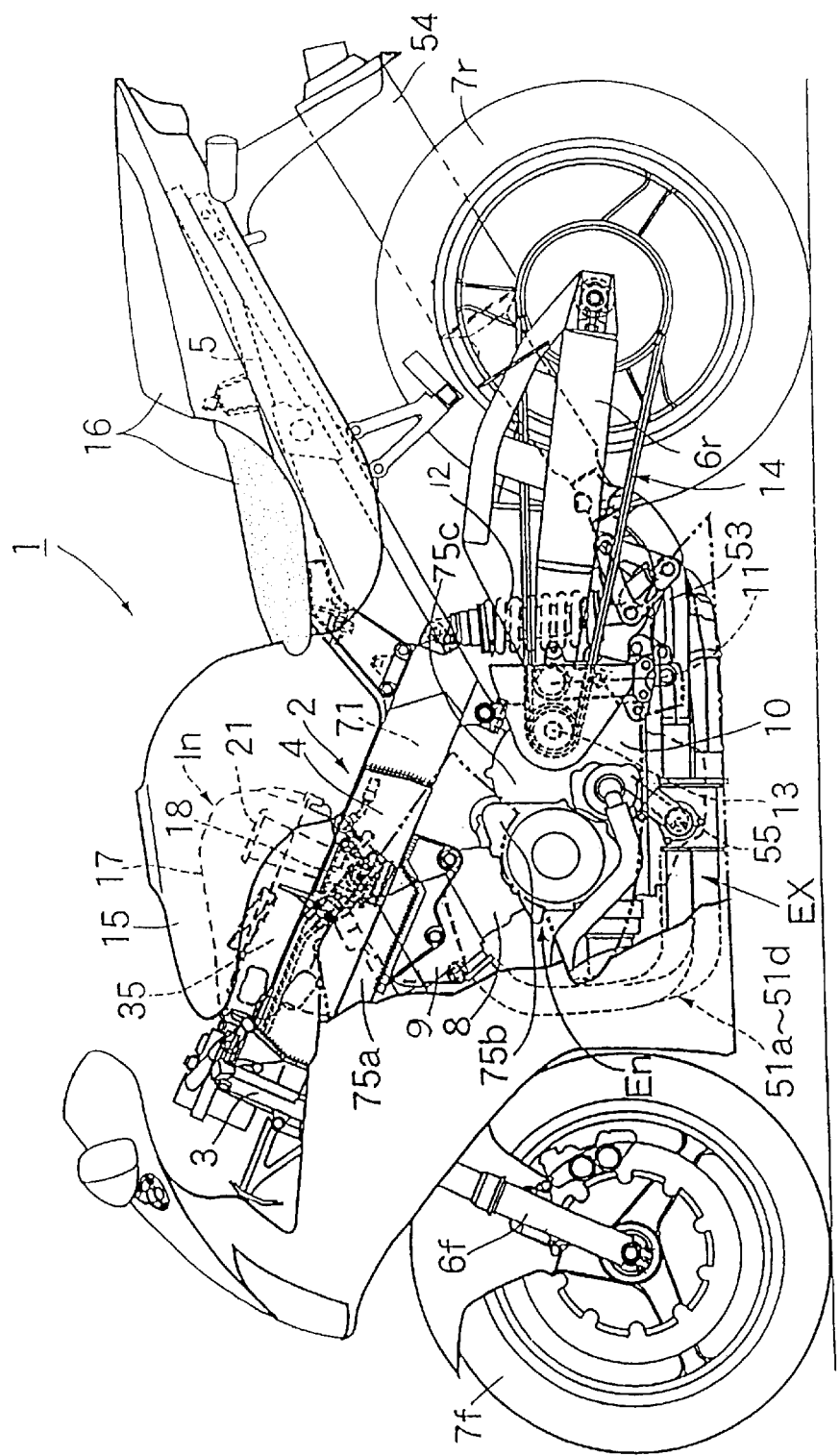
FIG. 1 is a side view of a motorcycle including intake and exhaust control systems according to an embodiment of the present invention.

FIG. 1 is a side view of a motorcycle including intake and exhaust control systems according to an embodiment of the present invention. In FIG. 1, a body frame 2 of a motorcycle 1 includes a pair of right and left main frames 4 which have a head pipe 3 at the front ends thereof, and are connected to each other at the rear ends thereof. Seat rails 5 are connected to the rear ends of the main frames 4 and extend rearwardly and upwardly therefrom. A parallel four-cylinder engine En is mounted on the pair of main frames 4 in so that a cylinder block 8 and a cylinder head 9 are tilted slightly forwardly and the cylinder head 9 is inserted between the main frames 4.

A front fork 6f for rotatably supporting a front wheel 7f is steerably connected to the head pipe 3. A rear fork 6r for supporting a rear wheel 7r is vertically swingably connected, via a pivot 11, to a rear portion of a crank case 10 of the engine En, and a rear cushion 12 is interposed between the rear fork 6r and the main frames 4. The rear wheel 7r is driven via a chain transmission system 14 by an output shaft 13, disposed in front of the pivot 11, of the engine En.

A fuel tank 15 is mounted on the main frames 4, and a tandem main seat 16 is mounted on the seat rails 5.

An intake system In of the engine En including an air cleaner 17 and throttle bodies 18 is disposed over the cylinder head 9 so as to be covered by the fuel tank 15. An exhaust system Ex of the engine En including exhaust pipes 51a to 51d and an exhaust muffler 54 projects from the front surfaces of the cylinder head 9 and the cylinder block 8, passes under the crank case 10, and extends obliquely upwardly.

Referring to FIGS. 1 to 6, the intake system In of the engine En will be first described.

Referring to FIGS. 1 to 4, four pieces of the throttle valves 18 corresponding to four cylinders of the engine En are connected to the cylinder head 9 of the engine En. Air funnels 21 are connected to inlets of intake passages 18a of the throttle valves 18. A cleaner case 22 of the air cleaner 17 is mounted to the four throttle valves 18 so as to house all of the air funnels 21. The cleaner case 22 includes a lower case half 22b fixed to the throttle valves 18, and a upper case half 22a separably connected to the lower case half 22b with a small screw 27. An element mounting plate 25 for partitioning the inside of the cleaner case 22 into a lower side non-clean chamber 23 and an upper side clean chamber 24 is held between both the case halves 22a and 22b. A cleaner element 26 is mounted in a mounting hole 25a provided in the element mounting plate 25.

An air inlet 28 through which the non-clean chamber 23 is opened to atmospheric air is provided in one side surface of the lower case half 22b. The air funnels 21 pass through a bottom wall of the lower case half 22b, and inlets of the air funnels 21 are opened to the clean chamber 24.

Accordingly, during operation of the engine En, air having flowed in the non-clean chamber 23 from the air inlet 28 is filtered by the cleaner element 26, and is supplied in the clean chamber 24. The air supplied in the cleaner chamber 24 flows in the throttle bodies 18 through the air funnels 21. In each of the throttle bodies 18, the flow rate of the air is adjusted by a throttle valve 29. The air whose flow rate has been adjusted by each throttle body 18 is then sucked in the engine En. At this time, fuel is injected from a fuel injection valve 32 mounted on one side wall of each throttle body 18 into an intake port of the engine En.

Valve shafts 29a of the throttle valves 29 provided in the four throttle bodies 18 are interlocked with each other, and are operated to open/close the throttle valves 29 by a throttle grip additionally provided on a steering handlebar of the motorcycle 1 via a pulley 30 fixed on the outermost valve shaft 29a and an operating wire 31 wound around the pulley 30.

A partition wall 34 for partitioning an intermediate portion of the non-clean chamber 23 into a lower small cross-section passage 33a and an upper large cross-section passage 33b is integrally provided on the inner side of the lower case half 22b, and an intake control valve 35 for opening/closing the large cross-section passage 33b is rotatably supported by the partition wall 34.

The intake control valve 35 includes a valve plate 36 and a valve shaft 37 integrally provided on one end of the valve plate 36. One bearing 38 for rotatably supporting one end portion of the valve shaft 37 and a pair of right and left bearings 39 for rotatably supporting the other end portion of the valve shaft 37 are provided on the partition wall 34.

Figure 2:
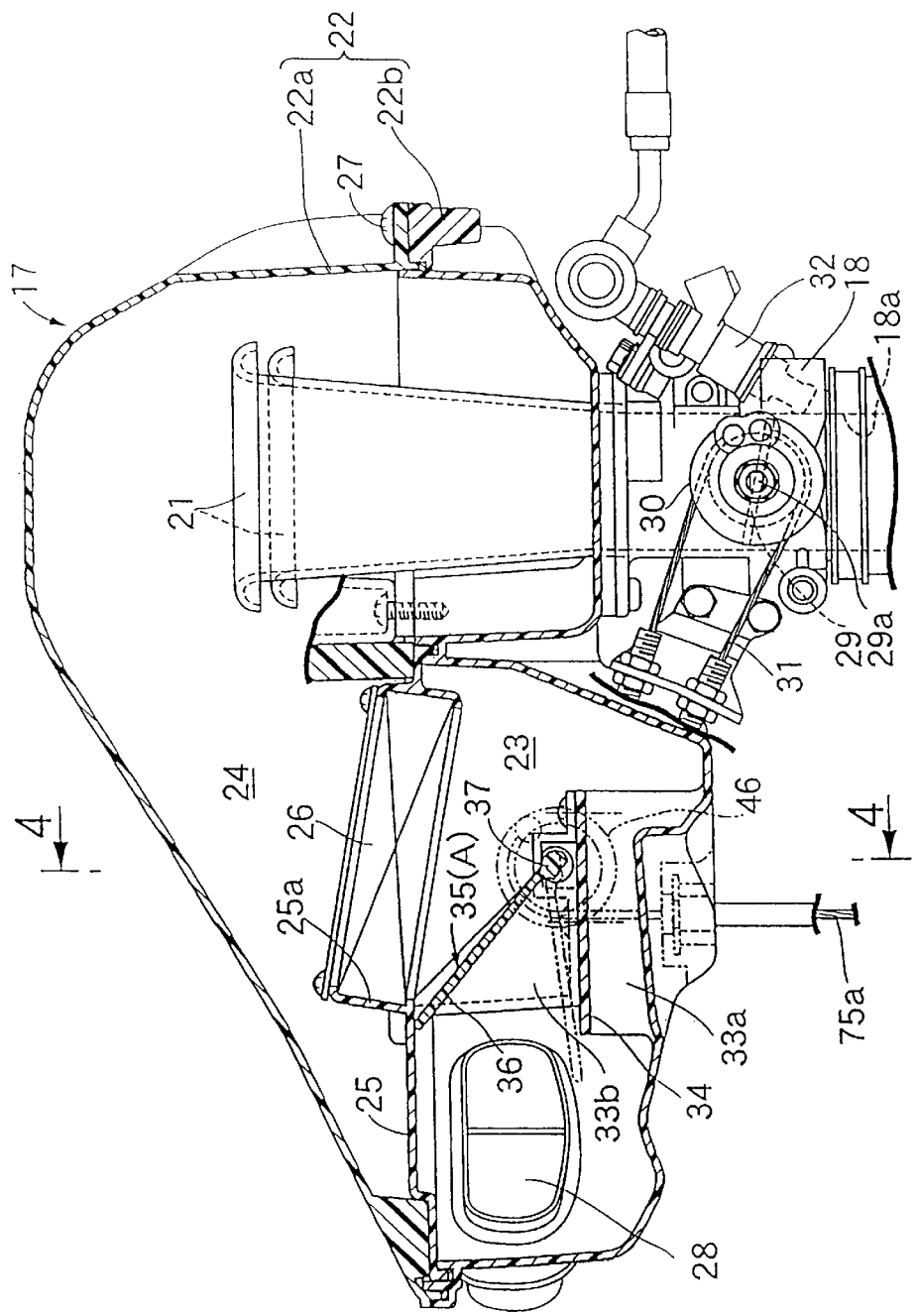
FIG. 2 is a sectional side view of an intake control system according to an embodiment of the present invention.
Figure 3:
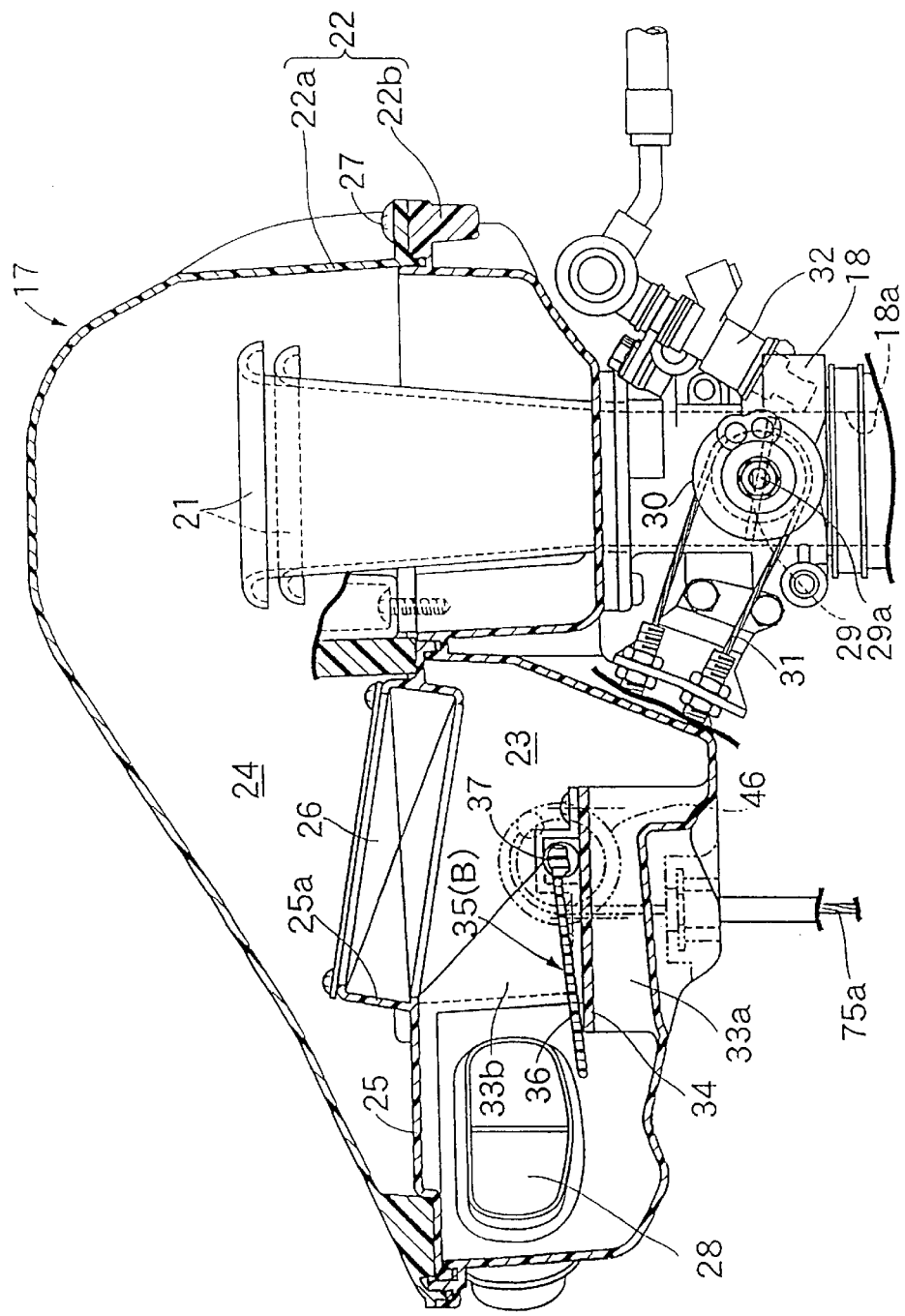
FIG. 3 is a view illustrating the function of the intake control system shown in FIG. 2.
Figure 4:
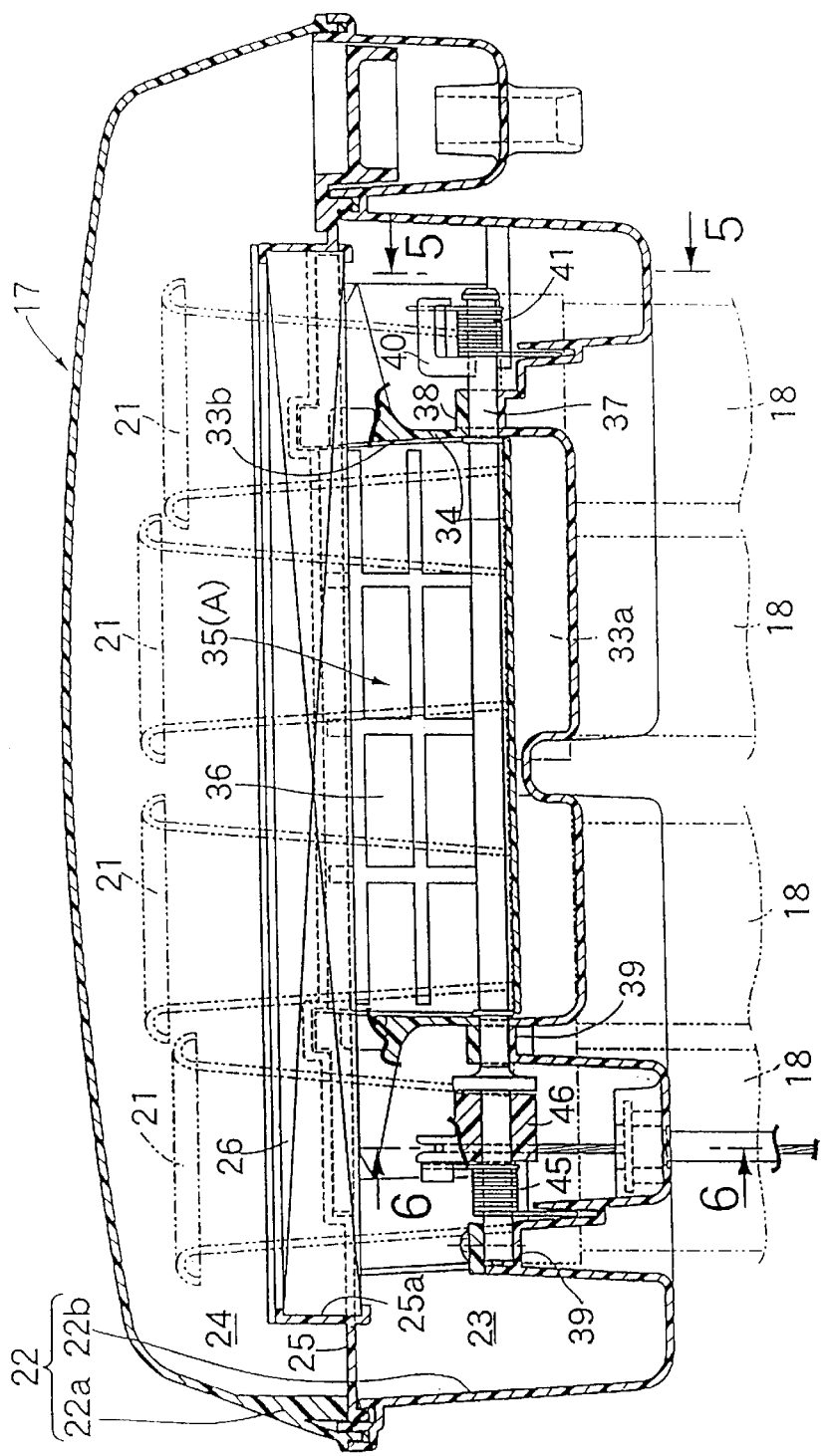
FIG. 4 is a sectional view taken on line 4—4 of FIG. 2.
Figure 5:
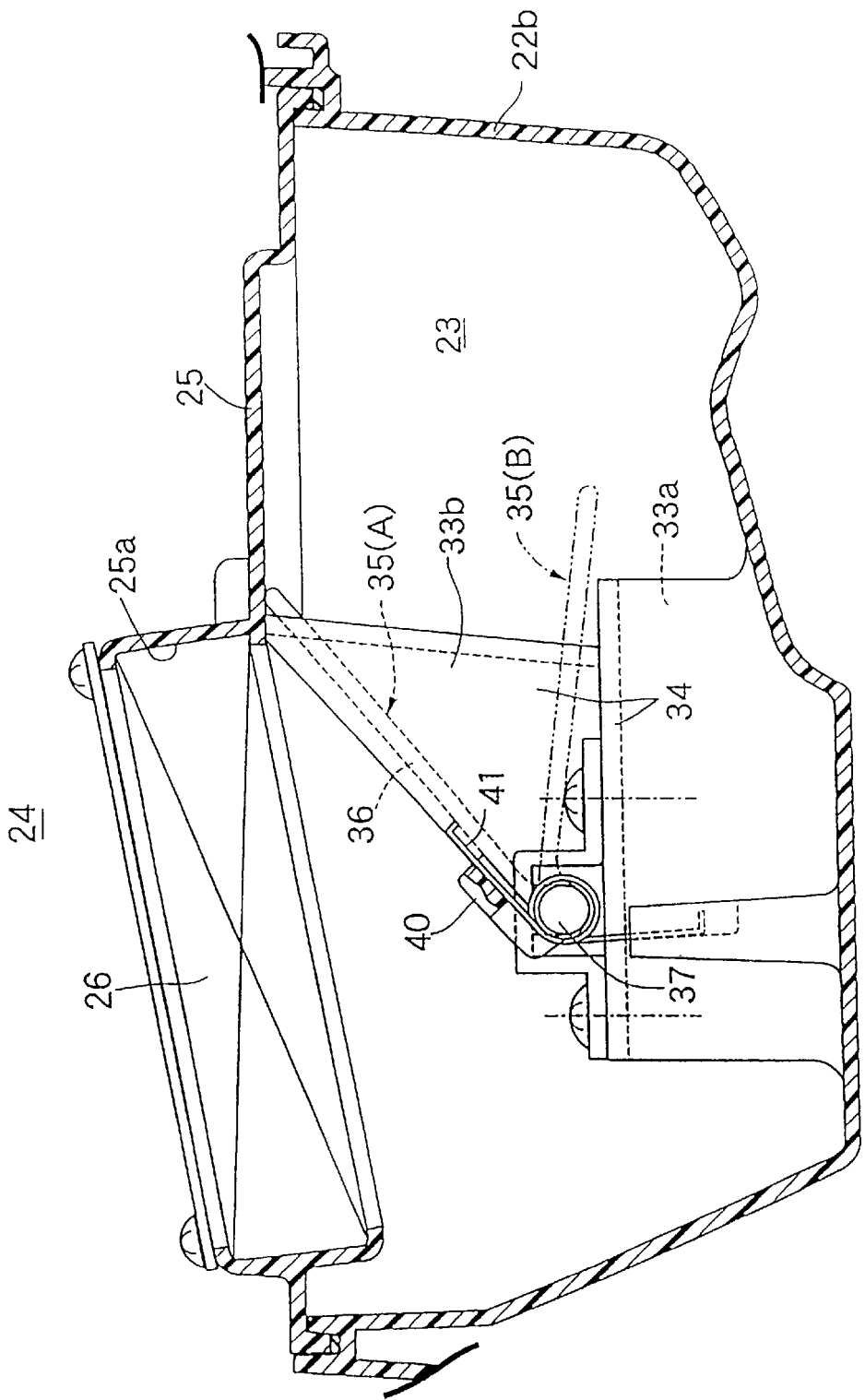
FIG. 5 is a sectional view taken on line 5—5 of FIG. 4.
Figure 6:
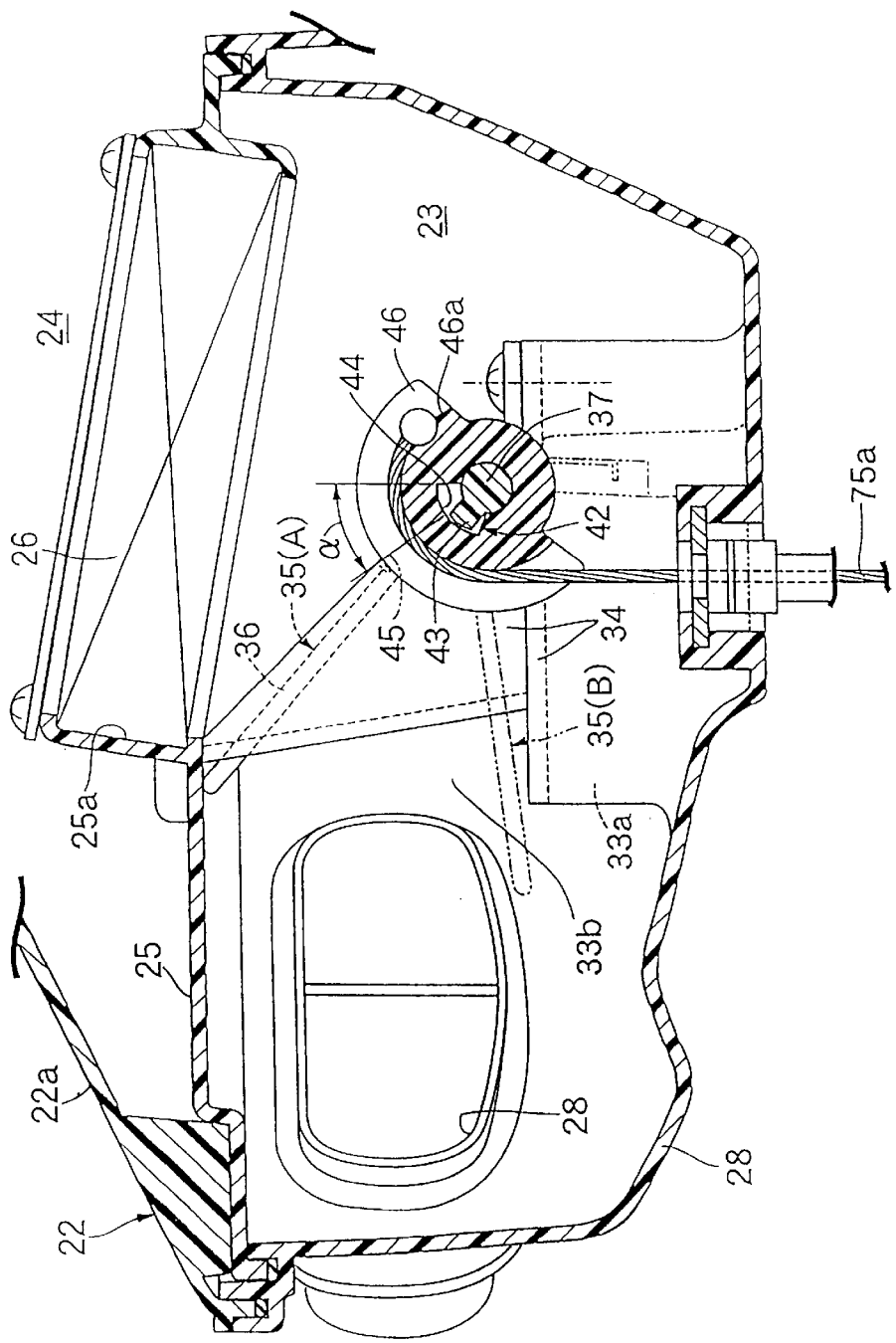
FIG. 6 is sectional view taken on line 6—6 of FIG. 4.

The intake control valve 35 is turned between a first intake control position A (see FIG. 2) and a second intake control position B (see FIG. 3). At the first intake control position A, the tip of the valve plate 36 is brought into contact with a ceiling surface of the large cross-section passage 33b to fully close the large cross-section passage 33b. At the second intake control position B, the valve plate 36 is thrown down in parallel to the partition wall 34 to fully open the large cross-section passage 33b. In the example of the intake control valve 35 shown in the figures, the turning angle of the intake control valve 35 between the first and second intake control positions A and B is set at approximately 45 degrees. Additionally, at the second intake control position B of the intake control valve 35, the valve plate 36 is tilted with its tip directed to the upstream side of the large cross-section passage 33b, and the intake negative pressure of the engine En acts to bias the valve plate 36 in the closing direction.

An arm 40 is integrally formed on one end portion of the valve shaft 37. A return spring 41 for biasing the valve plate 36 in the closing direction, that is, on the first intake control position A side via the arm 40, is connected to the arm 40. A driven pulley 46 is rotatably mounted on the other end portion of the valve shaft 37 at a position between the pair of bearings 39. The driven pulley 46 is connected to a drive pulley 73 of an actuator 71 (which will be described later) via a first transmission wire 75a. A lost motion mechanism 42 for connecting the driven pulley 46 and the valve shaft 37 to each other is provided between the driven pulley 46 and the valve shaft 37. The lost motion mechanism 42 includes a transmission pin 43 projecting from one side surface of the valve shaft 37, a circular-arc groove 44 formed in the inner peripheral surface of the driven pulley 46 and extending in the circumferential direction to be engaged with the transmission pin 43, and a lost motion spring 45 for biasing the driven pulley 46 on the first intake control position A side of the intake control valve 35.

The center angle of the circular-arc groove 44 is set to be larger than the opening/closing angle of the intake control valve 35. Specifically, when the driven pulley 46 is turned from the retreated position in the direction of opening the intake control valve 35, that is, on the second intake control position B side, one end surface of the circular-arc groove 44 is brought into contact with the transmission pin 43 after it is turned by a specific play angle α, to move the intake control valve 35 on the second intake control position B side.

Next, the exhaust system Ex of the engine En will be described in detail with reference to FIG. 1 and FIGS. 7 to 17.

Figure 7:
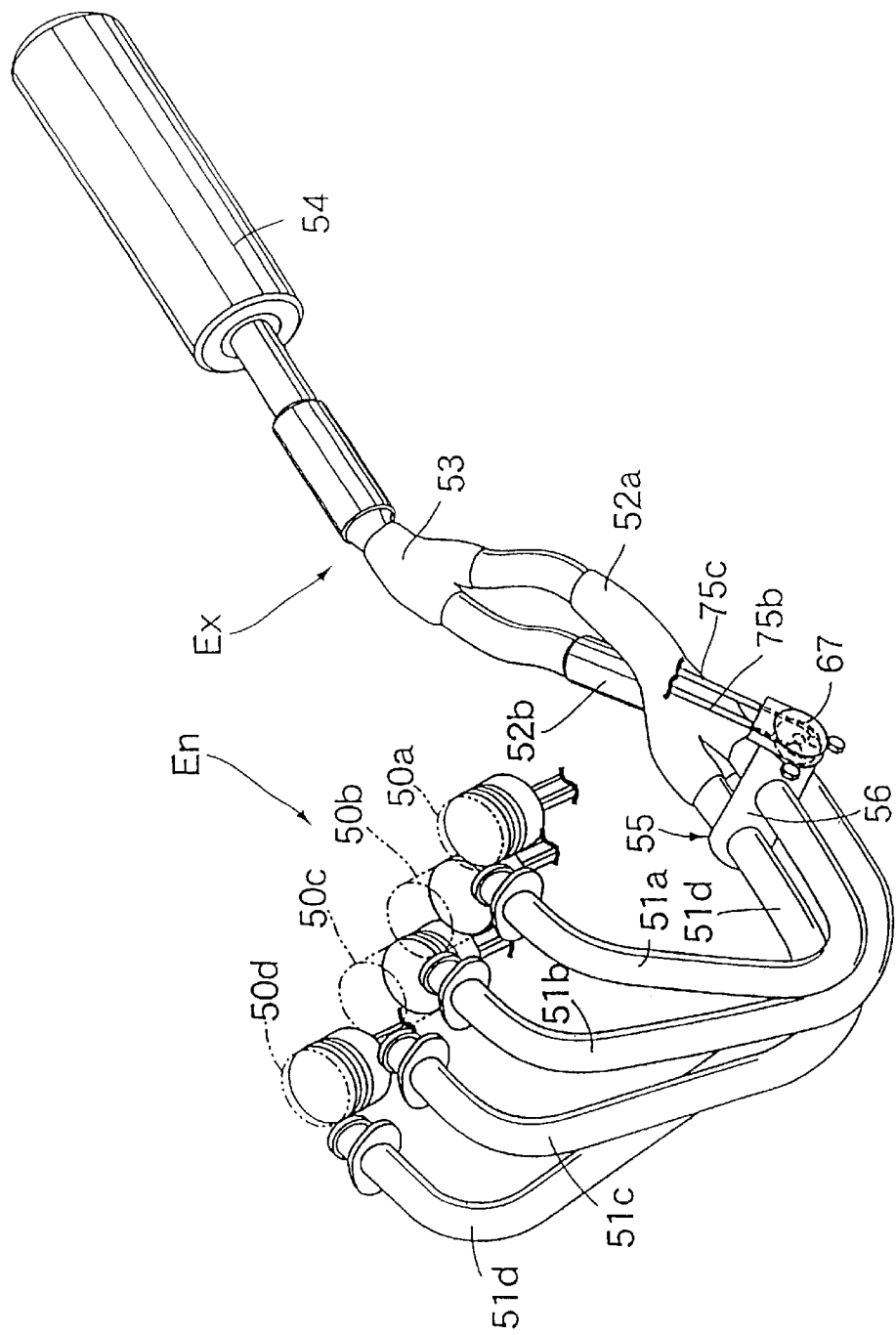
FIG. 7 is perspective view of an exhaust system according to an embodiment of the present invention.

Referring first to FIGS. 1 and 7, the parallel four cylinders 50a to 50d of the engine En are arranged in this order from the left side of the vehicle, and ignition of each cylinder is performed in the order of the first, second, fourth, and third cylinders 50a, 50b, 50d and 50c. The first to fourth exhaust pipes 51a to 51d corresponding to the first to fourth cylinders 50a to 50d are connected to the front surface of the cylinder head 9. These exhaust pipes 51a to 51d extend downwardly along the front surface of the engine E and curve rearwardly under the engine En. The first and fourth exhaust pipes 51a and 51d are, under the engine En, adjacently disposed in the lateral direction, and the second and third exhaust pipes 51b and 51c are, directly under the first and fourth exhaust pipes 51a and 51d, adjacent to one another. An exhaust control valve 55 is provided at intermediate portions of these exhaust pipes 51a and 51d.

Referring to FIGS. 8 to 12, the exhaust control valve 55 includes a common valve housing 56 interposed in the intermediate portions of the first to fourth exhaust pipes 51a to 51d, and a valve body 57 mounted in the valve housing 56. The upstream sides and the downstream sides of the first to fourth exhaust pipes 51a and 51d are connected to a front flange 56A and a rear flange 56B formed at both ends of the valve housing 56 in the longitudinal direction, respectively. The valve housing 56 has a pair of inlet ports 56a opened to the end surface of the front flange 56A and matched to the upstream pipe lines of the first and fourth exhaust pipes 51a and 51d and a pair of outlet ports 56b opened to the end surface of the rear flange 56B and matched to the downstream pipe lines of the first and fourth exhaust pipes 51a and 51d. The valve housing 56 also has a cylindrical valve chamber 56c interposed between the inlet ports 56a and the outlet ports 56b and extending in the direction perpendicular to the axial lines of these ports, and a pair of communication ports 56d formed between the front and rear flanges 56A and 56B and matched to the upstream pipe lines and the downstream pipe lines of the second and third exhaust pipes 51b and 51c. A pair of communication holes 56e for communicating the communication ports 56d to the valve chamber 56c are provided on the upper side of the communication ports 56d.

One end of the valve chamber 56c is blocked with an end wall integrated with the valve housing 56, and a bearing bush 59 is mounted in the end wall. The other end of the valve chamber 56c is opened and closed with a bearing bracket 58 fixed to the valve housing 56 with a bolt 64. The bearing bracket 58 includes a bearing bush 60 disposed coaxially with the bearing bush 59.

The valve body 57 is rotatably mounted in the valve chamber 56c. The valve body 57 has a generally cylindrical shape. Valve shafts 61 and 62 are integrally formed on both ends of the valve body 57 in the axial direction, and are rotatably supported by the bearing bushes 59 and 60, respectively. The valve shafts 61 and 62 are turned between a low speed control position C, a medium speed control position D, and a high speed control position E.

The bearing bush 60 of the bearing bracket 58 projects slightly from the inner end surface of the bearing bracket 58 for supporting the end surface of the valve body 57. The bearing bush 60 is made from a nonmetal material excellent in not only bearing characteristic but also sealing characteristic. The bearing bush may be made from, for example, carbon graphite.

A driven pulley 67 is fixed to the tip portion, projecting outwardly from the bearing bracket 58, of the valve shaft 62 with a nut 65. The driven pulley 67 is driven via second and third transmission wires 75b and 75c by the drive pulley 73 of the actuator 71.

A flange portion 80 having an annular holding recess 80a opened to the bearing bracket 58 side is integrally formed on the driven pulley 67. An annular retainer 81 and two thrust washers 82 and 82' relatively rotatably held in the retainer 81 are housed in the holding recess 80a. A thrust spring 83 is provided between the thrust washers 82 and 82' and the bearing bracket 58 so as to be contracted by a specific load, whereby the end surface of the valve body 57 is pressed to the end surface of the bearing bush 60 in a sealing state. In this state, a gap "g" is formed between the end wall, opposed to the bearing bracket 58, of the valve housing 56 and the opposed end surface of the valve body 57. The gap "g" is formed to allow for thermal expansion of the valve body 57 in the axial direction.

The valve body 57 has a pair of through-holes 57a crossing the axial line of the valve body 57 and being allowed to be matched to the inlet ports 56a and the outlet ports 56b, and communication holes 57b for opening one-sided surfaces of the through-holes 57a in the radial direction of the valve body 57.

At the low speed control position C of the valve body 57 (see FIGS. 9 and 10), the communication holes 57b are matched to the inlet ports 56a of the valve housing 56, the one-end sides of the through-holes 57a are matched to the communication holes 56e of the valve housing 56, and the outlet ports 56b are closed with valve walls 57A, opposed to the communication holes 57b, of the valve body 57.

At the medium speed control position D (see FIG. 11), the through-holes 57a are matched to the inlet and outlet ports 56a and 56b, and the communication holes 56e are closed with the valve walls 57A. The outer surface of the valve wall 57A has a circular-arc recess 57c which is continuous to the inner peripheral surface of the communication port 56d at the medium speed control position D (see FIG. 11).

At the high speed control position E (see FIG. 13), the through-holes 57a are matched to the inlet and outlet ports 56a and 56b, and the communication holes 57b are matched to the communication holes 56e. Accordingly, the medium speed control position D and the high speed control position E of the valve body 57 are separated from each other by about 180 degrees, and the low speed control position C is present at an intermediate point therebetween.

Figure 13:
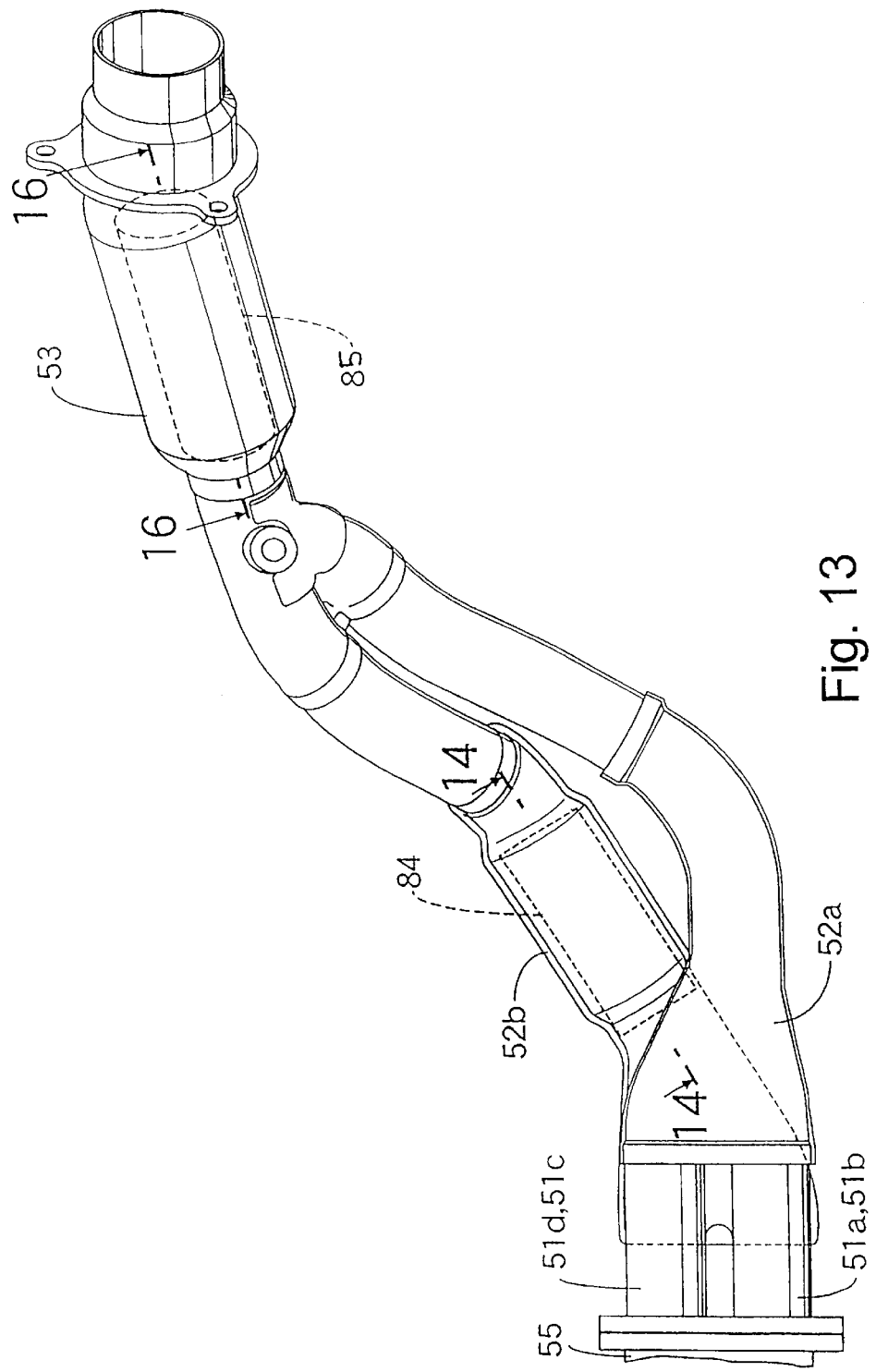
FIG. 13 is an enlarged plan view showing an exhaust system according to the present invention.

Referring to FIGS. 1, 7 and 13, on the downstream side from the exhaust control valve 55 located at the intermediate portions of the first to fourth exhaust pipes 51a to 51d, the first and fourth exhaust pipes 51a and 51d are connected to an upper first exhaust collection pipe 52a for collecting the first and fourth exhaust pipes 51a and 51d, and the second and third exhaust pipes 51b and 51c are connected to a lower first exhaust collection pipe 52b for collecting the second and third exhaust pipes 51b and 51c. The exhaust collection pipes 52a and 52b are connected to a second exhaust collection pipe 53 for collecting the exhaust collection pipes 52a and 52b, and the exhaust muffler 54 is connected to the rear end of the second exhaust collection pipe 53. Of the upper and lower first exhaust collection pipes 52a and 52b, only the lower first exhaust collection pipe 52b connected to the communication ports 56d of the exhaust control valve 55 is provided with a primary exhaust purifying system 84, and the second exhaust collection pipe 53 is provided with a secondary exhaust purifying system 85.

Figure 14:
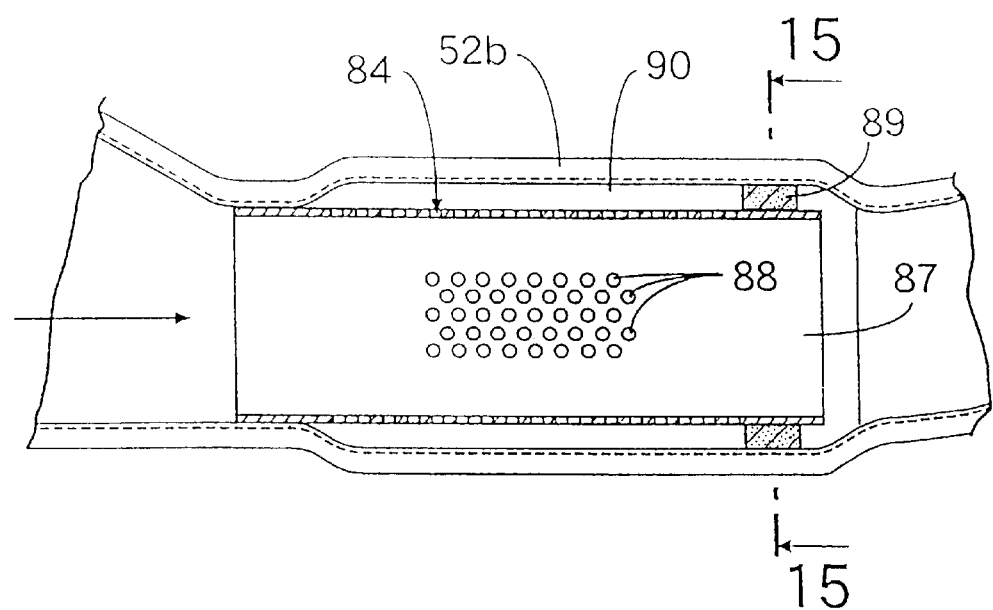
FIG. 14 is a sectional view taken on line 14—14 of FIG. 13.
Figure 15:
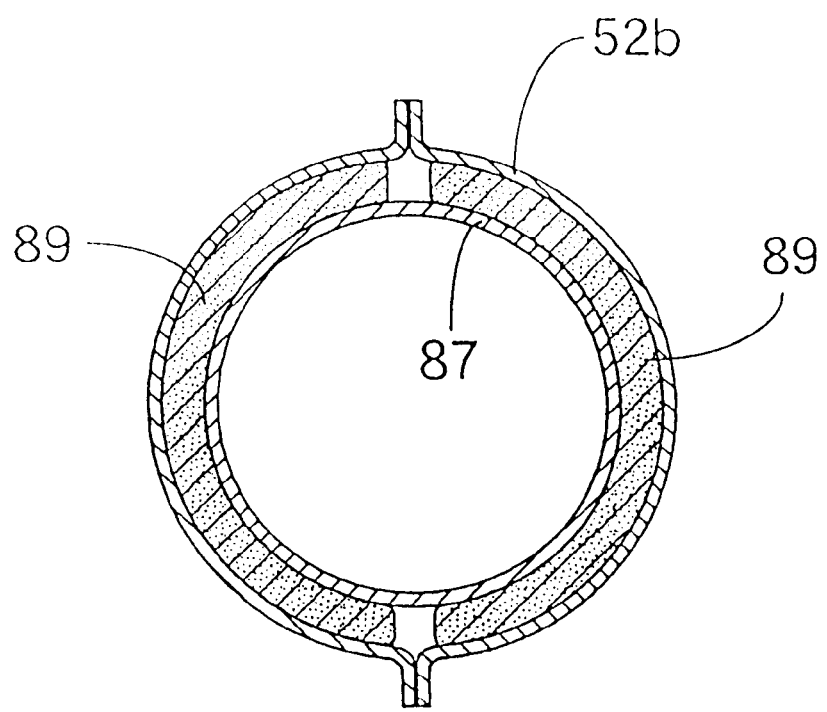
FIG. 15 is a sectional view taken on line 15—15 of FIG. 14.

The type of the primary exhaust purifying system 84 is not particularly limited, but according to this embodiment, the primary exhaust purifying system 84 is configured as a three way catalytic converter as shown in FIGS. 14 and 15, which includes a circular catalyst support 87 having a large number of through-holes 88 formed in its peripheral wall. To be more specific, the catalyst support 87 is held in the lower first exhaust collection pipe 52b so that one end portion is welded to the inner wall of the lower first exhaust collection pipe 52b, and the other end portion is slidably held by the same inner wall via a heat insulation member 89 made from glass wool, steel wool, or the like, and a cylindrical heat insulation space 90 is provided between an intermediate portion of the catalyst support 87 excluding both the ends and the lower first exhaust collection pipe 52b. Accordingly, thermal extension of the primary exhaust purifying system 84 is permitted by a sliding motion of the primary exhaust purifying system 84 against the heat insulation member 89, so that it is possible to suppress occurrence of thermal strain of the primary exhaust purifying system 84 and the lower first exhaust collection pipe 52b. By the presence of the heat insulation member 89 and the heat insulation space 90, it is possible to thermally insulate the primary exhaust purifying system 84 and to prevent the over-heating of the lower first exhaust collection pipe 52b.

Figure 16:
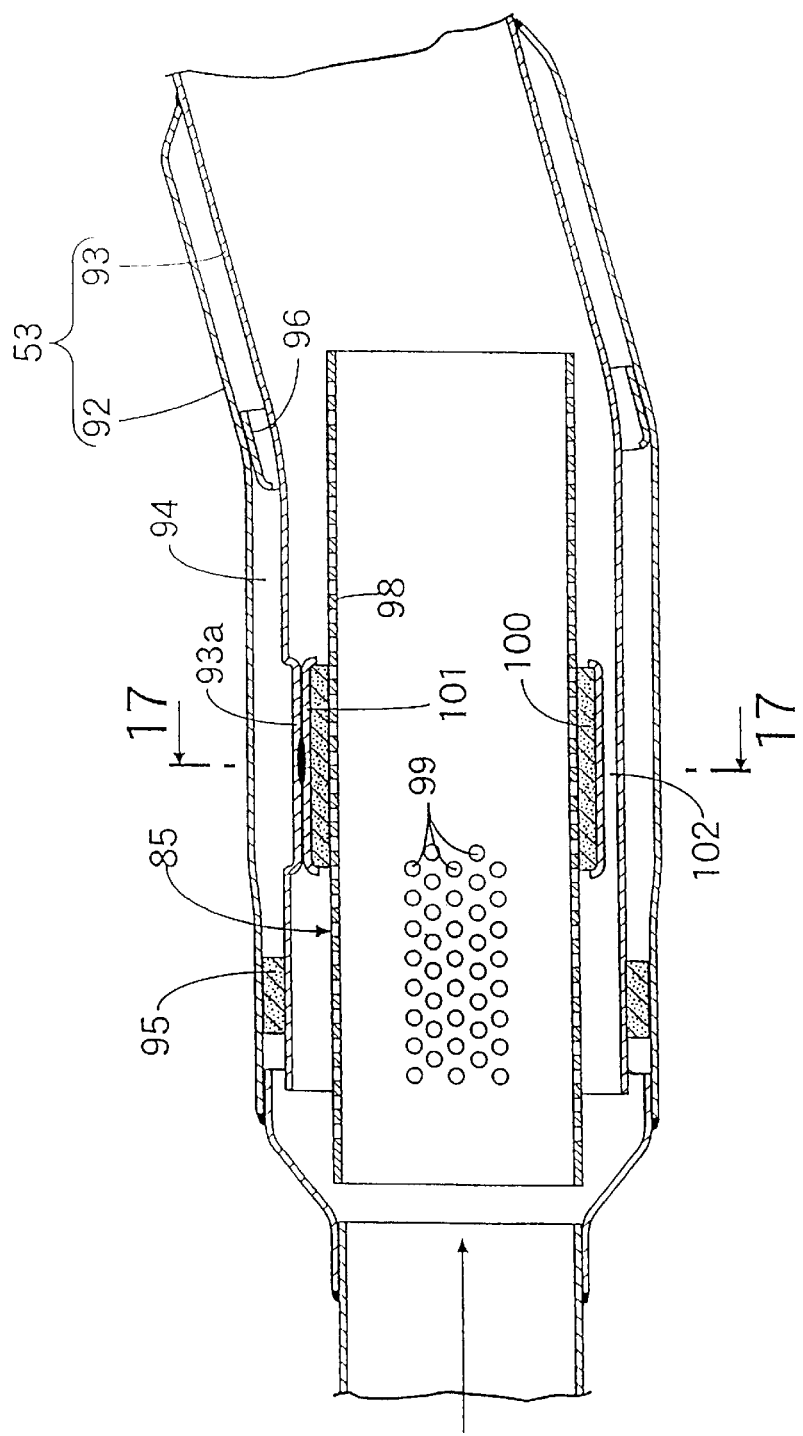
FIG. 16 is a sectional view taken on line 16—16 of FIG. 13.
Figure 17:
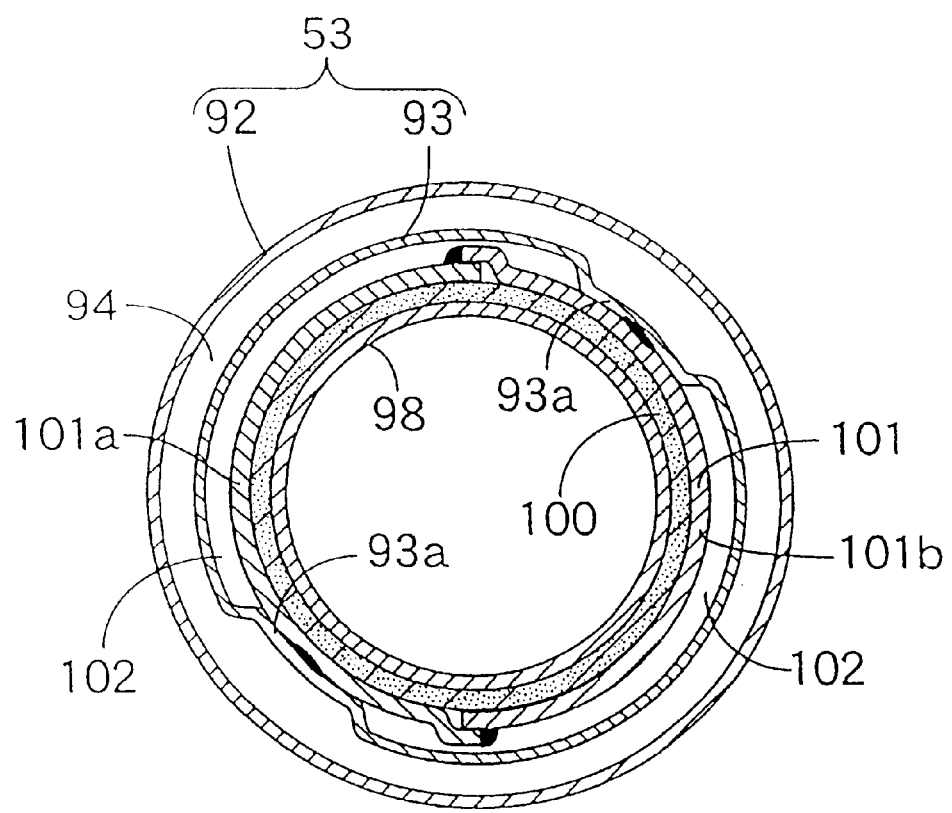
FIG. 17 is sectional view taken on line 17—17 of FIG. 16.

Referring to FIGS. 16 and 17, the second exhaust collection pipe 53 includes an outer pipe 92 extending on the upstream side, and an inner pipe 93 extending on the downstream side. The inner pipe 93 is disposed in the outer pipe 92 with a cylindrical heat insulation space 94 put therebetween. The downstream end of the outer pipe 92 is welded to the outer periphery of the inner pipe 93, and the upstream end of the inner pipe 93 is relatively slidably supported by the outer pipe 92 via a heat insulation member 95 made from glass wool, steel wool, or the like. An intermediate portion of the second exhaust collection pipe 53 is slightly bent, and at the bent portion, a guide ring 96 surrounding the inner pipe 93 is welded to the inner peripheral surface of the outer pipe 92.

The type of the secondary exhaust purifying system 85 is not particularly limited, but according to this embodiment, the secondary exhaust purifying system 85 is configured as a three way catalytic converter as shown in FIGS. 16 and 17, which includes a circular catalyst support 98 having a large number of through-holes 99 formed in its peripheral wall. The catalyst support 98 is mounted, at its axial central portion, to the inner pipe 93 via a heat insulation member 100 and a retainer ring 101. The heat insulation member 100 is made from glass wool, steel wool, or the like. The retainer ring 101 is formed by overlapping and welding end portions, opposed to each other, of a pair of semi-annular bodies 101a and 101b to each other. Upon formation of the retainer ring 101 by welding the semi-annular bodies 101a and 101b to each other, a compression force is given to the heat insulation member 100 to impart a frictional force, which is required for slidably retaining the catalyst support 98, between the heat insulation member 100 and the catalyst support 98. The inner pipe 93 has a pair of projections 93a projecting radially inwardly and opposed to each other in the diameter direction. The outer peripheral surface of the retainer ring 101 is welded to the projections 93a, and a heat insulation space 102 is provided between the retainer ring 101 and the inner pipe 93 while excluding the welded portion. A portion, other than the central portion retained by the retainer ring 101, of the catalyst support 98 is sufficiently separated from the inner peripheral surface of the inner pipe 93 for allowing exhaust gas to flow in or out of the catalyst support 98 through the large number of through-holes 99.

Since the secondary exhaust purifying system 85 is slidably retained, at its central portion, by the inner pipe 93 via the heat insulation member 100 and the retainer ring 101, the thermal extension of the secondary exhaust purifying system 85 is permitted by a sliding motion of the secondary exhaust purifying system 85 against the heat insulation member 100, so that it is possible to suppress occurrence of the thermal strain of the secondary exhaust purifying system 85 and the inner pipe 93. By the presence of the heat insulation member 100, heat insulation space 102, inner pipe 93, and heat insulation space 94 located outside the inner pipe 93, it is possible to reserve the heat of the secondary exhaust purifying system 85 and to prevent the over-heating of the outer pipe 92. Since the secondary exhaust purifying system 85 is stably retained at one retaining portion and exhaust gas is allowed to flow in or out of the catalyst support 98 through the through-holes 88 at the portion other than the retaining portion, it is possible to effectively purify the exhaust gas. The difference in thermal extension between the outer pipe 92 and the inner pipe 93 constituting the secondary exhaust collection pipe 53 is permitted by a sliding motion between the inner pipe 93, heat insulation member 95, and outer pipe 92. By the presence of the double heat insulation spaces 94 and 102 between the secondary exhaust purifying system 85 and the outer pipe 92, it is possible to effectively prevent the thermal deterioration of the secondary exhaust purifying system 85.

Next, a drive system for driving the intake control valve 35 and the exhaust control valve 55 will be described with reference to FIG. 1 and FIGS. 18 to 20.

Figure 18:
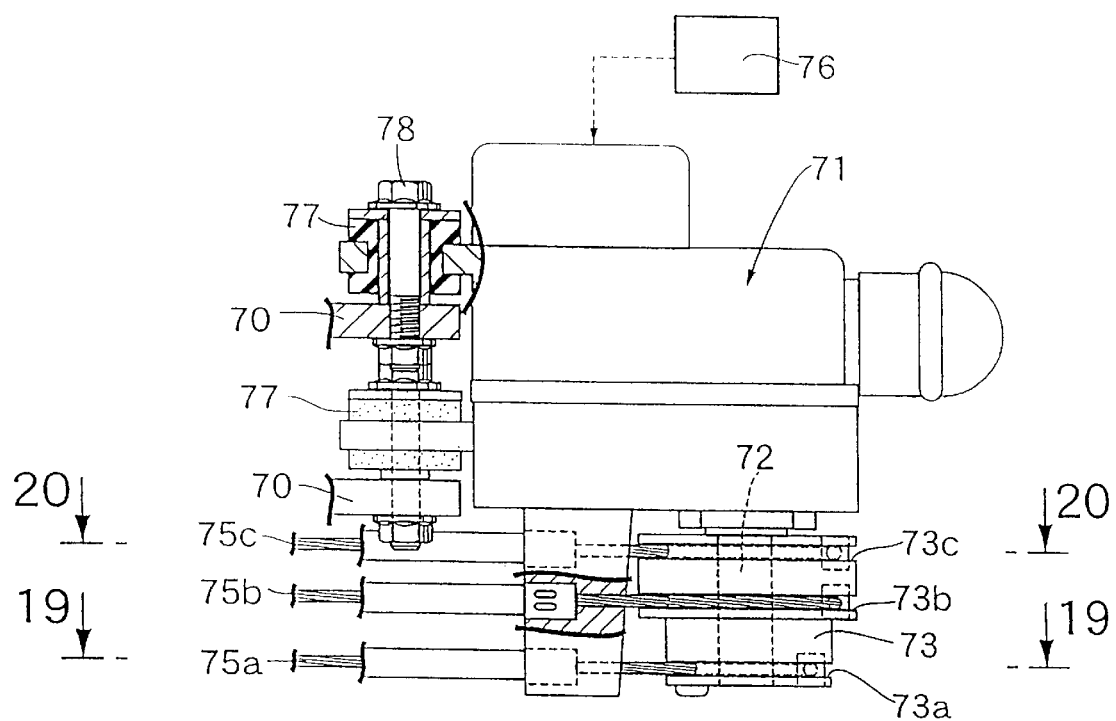
FIG. 18 is a plan view showing a drive system for driving the intake control valve and the exhaust control valve.
Figure 19:
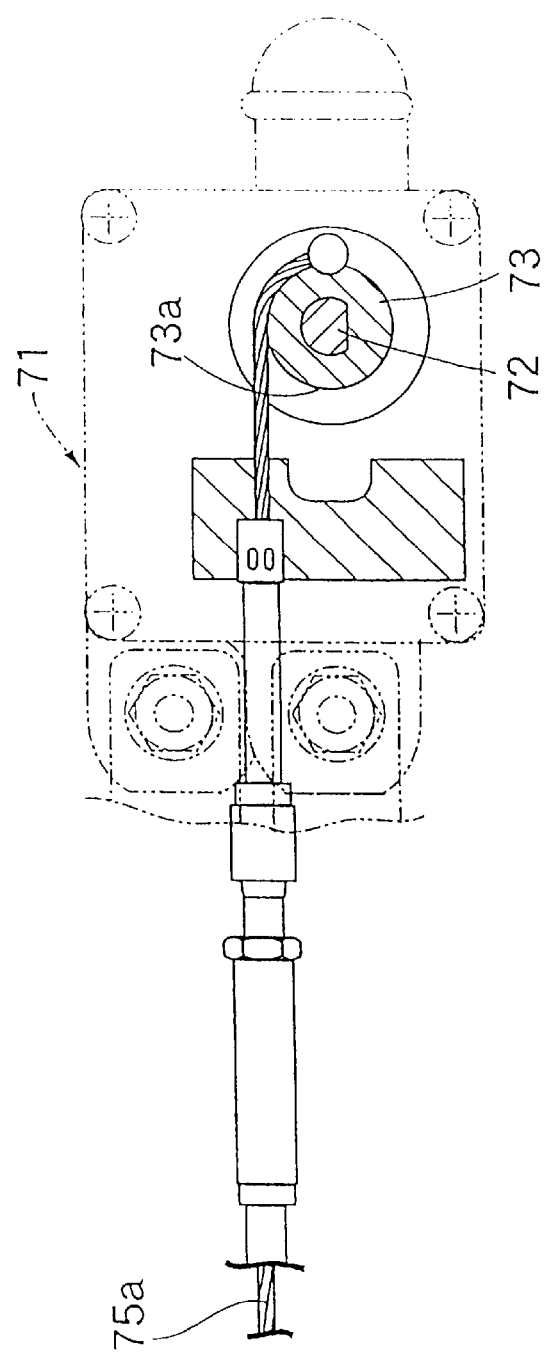
FIG. 19 is a sectional view taken on line 19—19 of FIG. 18.

Referring to FIGS. 1 and 18, a pair of brackets 70 are fixed on the inner surface of the main frame 4 at a position over the crank case 10 of the engine En, and the common actuator 71 is mounted via an elastic member 77 to the brackets 70 with a bolt 78. In this case, the actuator 71 is disposed such that a distance between the intake control valve 35 and the same is nearly equal to a distance between the exhaust control valve 55 and the same. According to the embodiment, as shown in FIG. 18, the actuator 71 is configured as a forward/reverse rotatable electric motor. The drive pulley 73 fixed to the output shaft 72 of the motor has a small-diameter first wire groove 73a, and large-diameter second and third transmission wire grooves 73b and 73c. A first transmission wire 75a is engaged in both the first wire groove 73a and a wire groove 46a of the driven pulley 46 (see FIG. 6) on the intake control valve 35 side, and both terminals of the wire 75a are connected to the drive pulley 73 and the driven pulley 46. The second and third transmission wires 75b and 75c are respectively engaged in the second and third wire grooves 73b and 73c and a pair of wire grooves 67b and 67c of the driven pulley 67 (see FIG. 9) on the exhaust control valve 55 side. In this case, the winding direction of the second transmission wire 75b is opposed to that of the third transmission wire 75c. Both terminals of each of the second and third transmission wires 75b and 75c are connected to the drive pulley 73 and the driven pulley 67.

Figure 20:
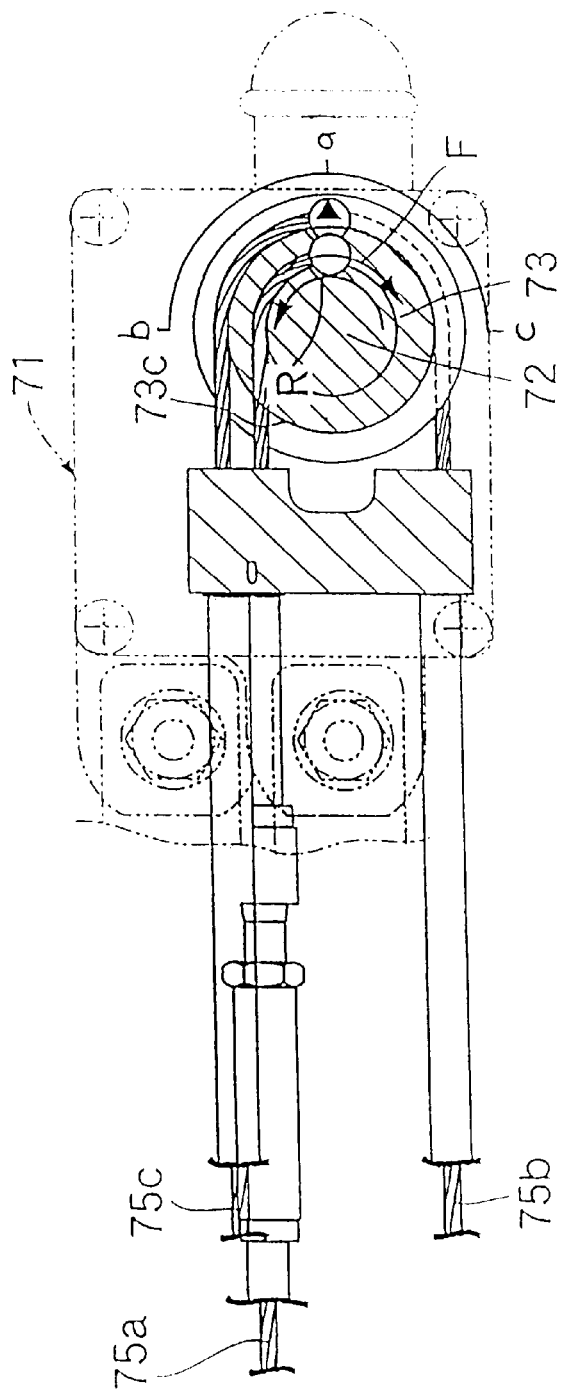
FIG. 20 is a sectional view taken on line 20—20 of FIG. 18.

An electronic control unit 76 connected to the actuator 71 decides a low speed rotational range, a medium speed rotational range, and a high speed rotational range of the engine En on the basis of the speed of the engine En, boosted negative pressure, and the like inputted from sensors (not shown), and controls the actuator 71 in accordance with the decided rotational range. In this way, as shown in FIG. 20, the actuator 71 holds the drive pulley 73 at an initial position "a" in the medium speed rotational range of the engine En; drives the drive pulley 73 from the initial position "a" to a first drive position "b" separated therefrom in the reversal rotation direction R by a specific angle in the low speed rotational range; and drives the drive pulley 73 from the first drive position "b" to a second drive position "c" separated therefrom while passing through the initial position "a" in the normal rotation direction F by a specific angle in the high speed rotational range.

The function of this embodiment will be described below.

Figure 8:
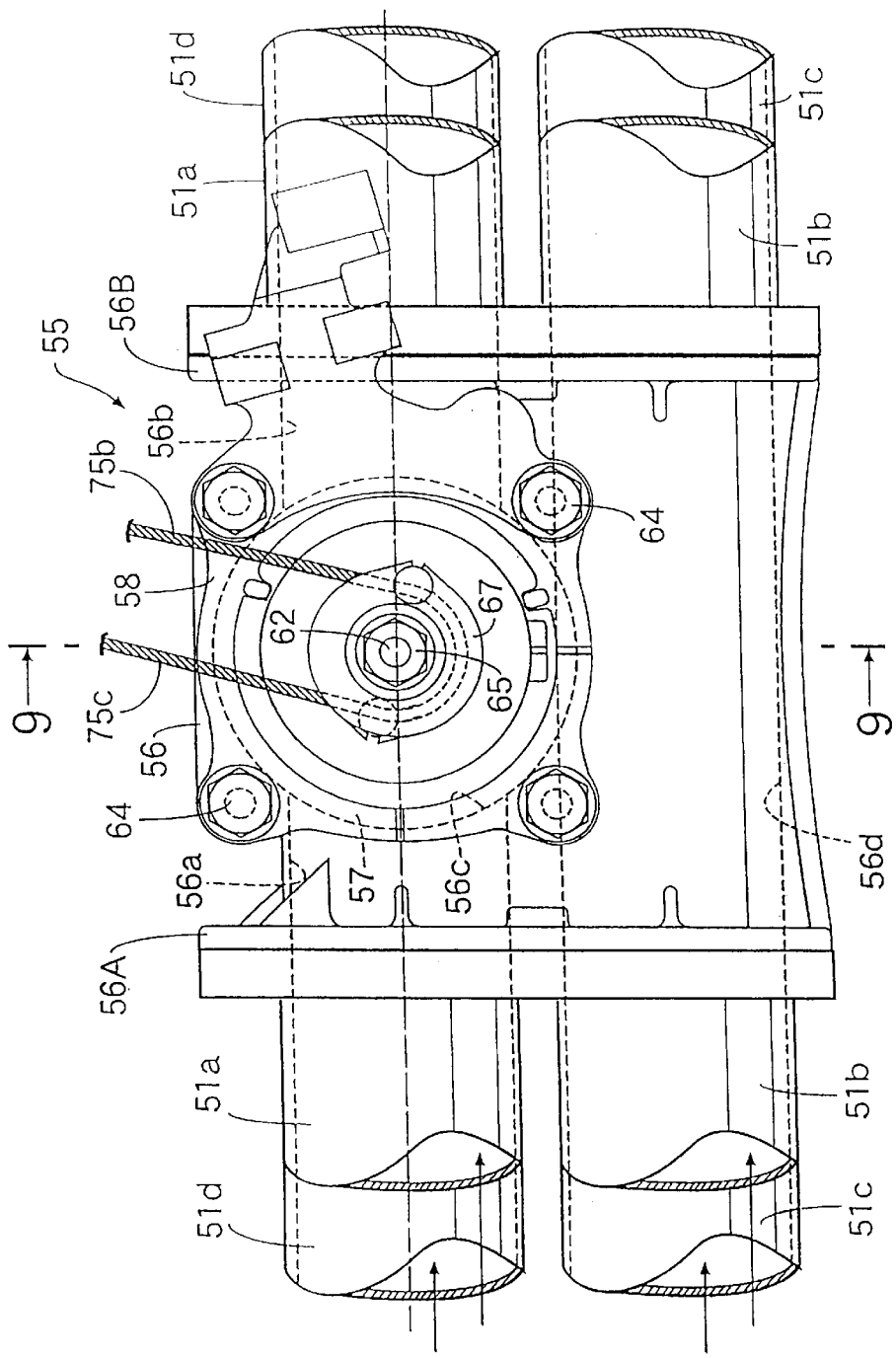
FIG. 8 is side view of the exhaust control system.
Figure 9:
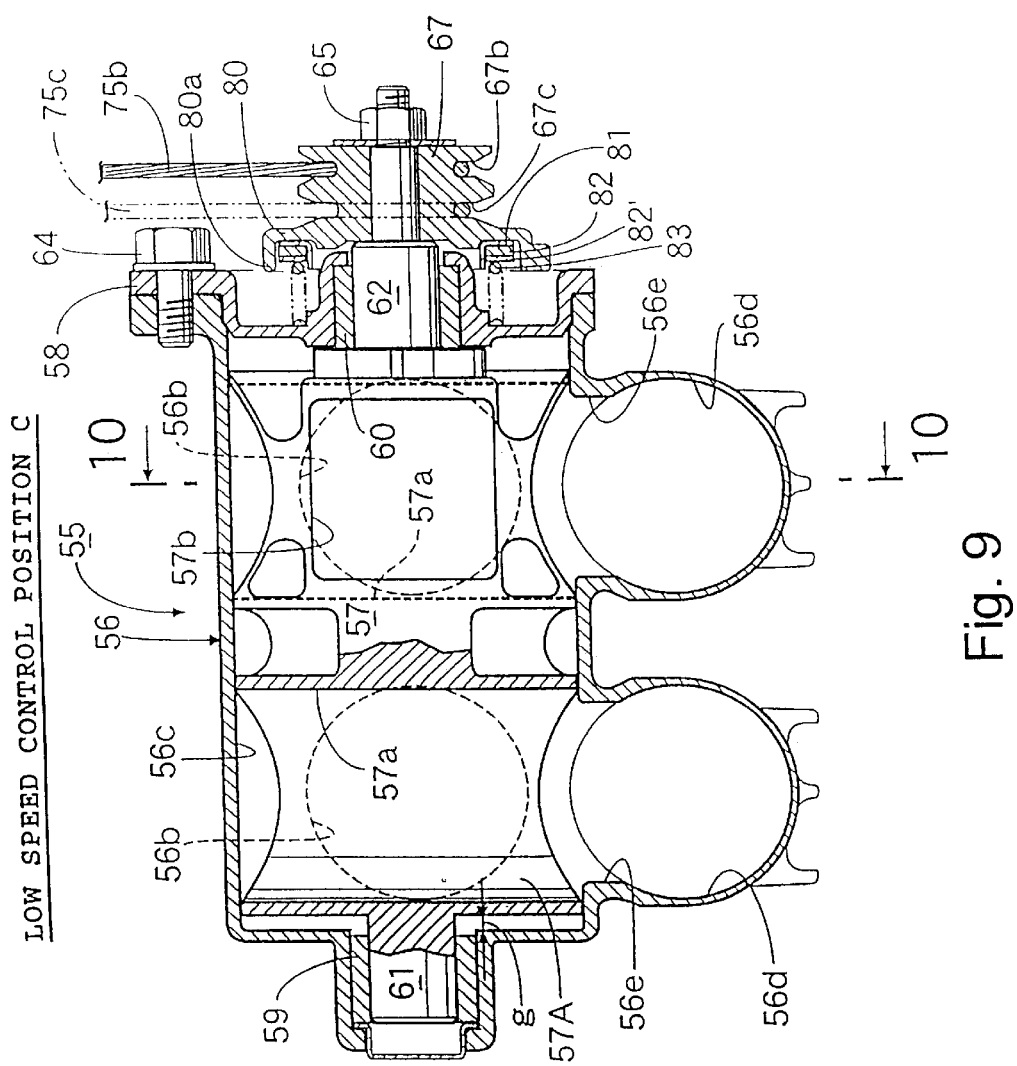
FIG. 9 is sectional view taken on line 9—9 of FIG. 8, showing an exhaust control valve located at a low speed control position.
Figure 10:
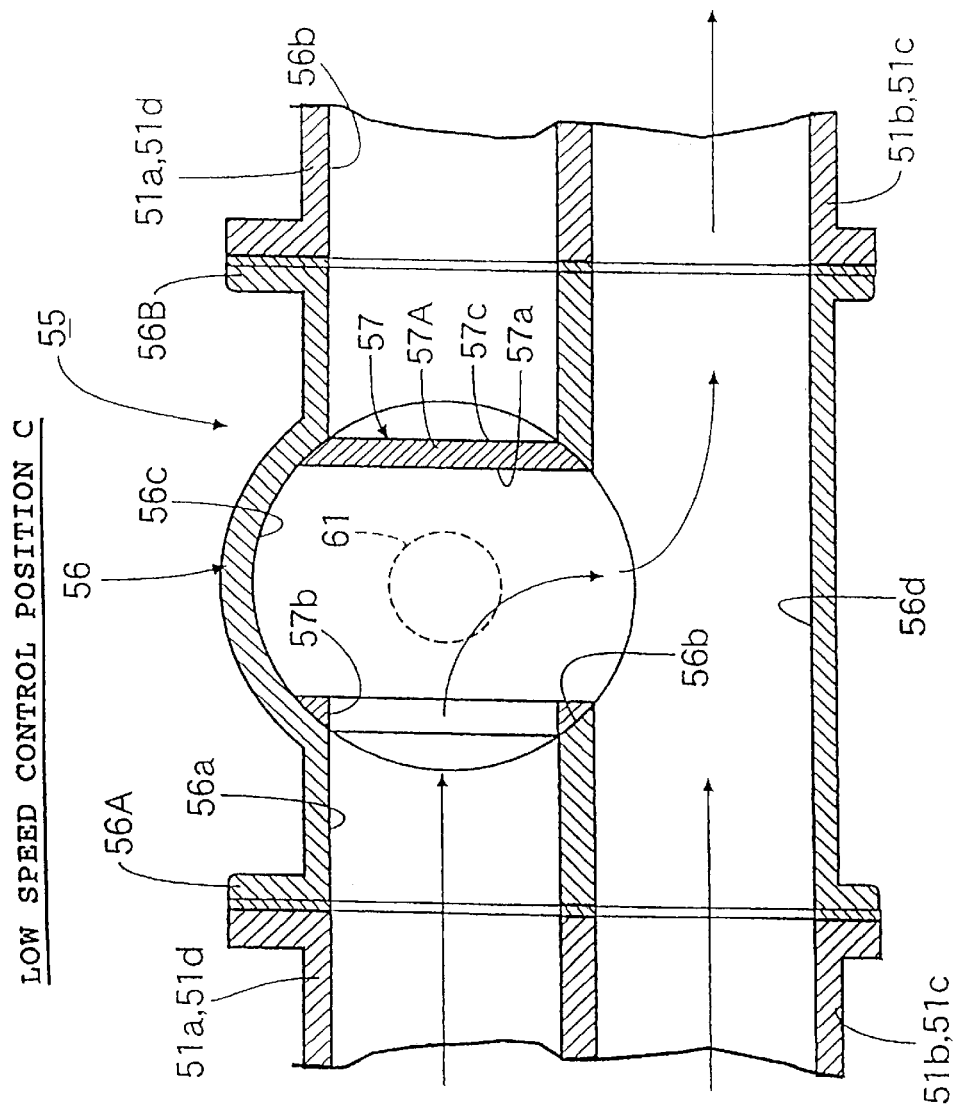
FIG. 10 is a sectional view taken on line 10—10 of FIG. 9.
Figure 11:
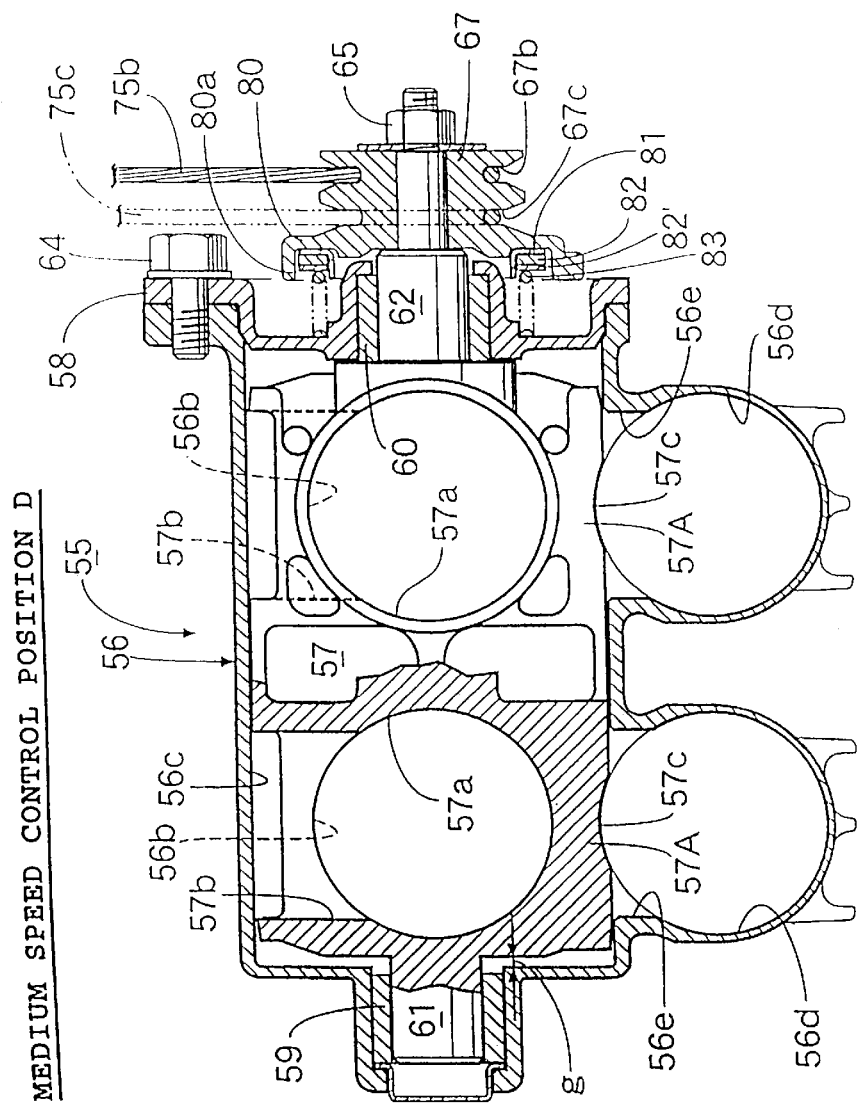
FIG. 11 is a sectional view, similar to FIG. 9, showing the exhaust control valve located at a medium speed control position.

When the drive pulley 73 is driven to the first drive position "b" by the actuator 71 in the low speed rotational range of the engine En, the drive pulley 73 pulls the first and second transmission wires 75a and 75b to turn the driven pulley 46 on the intake control valve 35 side in the valve opening direction (counterclockwise in FIG. 6) by a specific angle, and to turn the driven pulley 67 on the exhaust control valve 35 side counterclockwise in FIG. 8 by a specific angle for moving the valve body 57 of the exhaust control valve 35 to the low speed control position C shown in FIGS. 9 and 10.

The rotation of the driven pulley 46 by the specific angle, however, is performed within the range of the play angle α between the drive pulley 73 and the intake control valve 35 in the lost motion mechanism 42, and accordingly, the valve plate 36 of the intake control valve 35 is held at the first intake control position A by the biasing force of the return spring 41.

In such a state of the intake control valve 35, as shown in FIG. 2, the large cross-section passage 33b is fully closed with the valve plate 36, so that air sucked in the engine En passes through the air cleaner 17 through the small cross-section passage 33a. Accordingly, even upon accelerating operation (rapid opening of the throttle valve 29) in the low speed rotational range, it is possible to supply a suitable rich air-fuel mixture to the engine En while suppressing the leaning of the air-fuel mixture, and hence to achieve a good accelerating performance.

When the valve body 57 of the exhaust control valve 55 is moved to the low speed control position C shown in FIGS. 9 and 10, as described above, the communication holes 57b of the valve body 57 are matched to the inlet ports 56a of the valve housing 56 and the one-end sides of the through-holes 57a of the valve body 57 are matched to the communication holes 56e of the valve housing 56, and the output ports 56b are closed with the valve walls 57A of the valve body 57. Accordingly, exhaust gases having flowed from the upstream sides of the first and second exhaust pipes 51a and 51b into the valve chamber 56c through the inlet ports 56a of the valve housing 56 collide against the valve walls 57A of the valve body 57 to be curved to the communication port 56d side, and are joined to exhaust gases having passed the communication ports 56d from the upstream sides of the second and third exhaust pipes 51b and 51c. As a result, the exhaust resistance is increased, to apply an exhaust pressure suitable for the low speed rotational range from the exhaust pipes 51a to 51d to the engine En, thereby improving the low speed output performance by suppressing the blow-by of a new air from the cylinders 50a to 50d into the exhaust system during the valve overlapping period.

The exhaust gases having passed through the communication ports 56d of the valve housing 56 collectively flow in the lower first exhaust collection pipe 52b by way of the downstream sides of the second and third exhaust pipes 51b and 51c, and the joined exhaust gas is purified by the primary exhaust purifying system 84. Accordingly, the exhaust gases generated by the engine En all flow in the primary exhaust purifying system 84, and since the primary exhaust purifying system 84 is thermally insulated as described above, the primary exhaust purifying system 84 can be early activated, even directly after start-up of the engine En, by the exhaust heat and reaction heat. The exhaust gas having passed through the lower first exhaust collection pipe 52b is fed to the second exhaust collection pipe 53, and is further purified by the secondary exhaust purifying system 85. Since the secondary exhaust purifying system 85 is also thermally insulated as described above, it is possible to promote activation of the secondary exhaust purifying system 85.

In this way, in the low speed rotational range of the engine En, since all of the exhaust gases generated from the engine En are purified by the primary and secondary exhaust purifying systems 84 and 85, it is possible to enhance the purifying efficiency of the exhaust gas even if the temperature of the exhaust gas is relatively low.

During the above-described step, the downstream sides of the first and fourth exhaust pipes 51a and 51d are closed with the valve walls 57A of the valve body 57 to block the flow of the exhaust gases to the upper first exhaust collection pipe 52a, and accordingly, it is not required to provide any exhaust purifying system to the upper first exhaust collection pipe 52a.

When the rotational state of the engine En is shifted to the medium speed rotational range and the drive pulley 73 is returned to the initial position "a" by the actuator 71, the drive pulley 73 loosens the first transmission wire 75a and pulls the third transmission wire 75c. The loosening of the first transmission wire 75a allows the driven pulley 46 on the intake control valve 35 side to be only returned to the initial position shown in FIG. 6 within the range of the play angle α by the biasing force of the lost motion spring 45. At this time, there occurs no change of the intake control valve 35 located at the first intake control position A.

On the other hand, the driven pulley 67 on the exhaust control valve 55 side is turned by pulling the third transmission wire 75c, to move the valve body 57 to the medium speed control position D shown in FIG. 9. As a result, as described above, the through-holes 57a of the valve body 57 are matched to the inlet and outlet ports 56a and 56b of the valve housing 56 and the communication holes 56e are closed with the valve walls 57A, so that the first to fourth exhaust pipes 51a to 51d individually allow exhaust gases to pass therethrough. In particular, since the through-holes 57a of the valve body 57 are matched to the pipe lines of the first and fourth exhaust pipes 51a and 51d via the inlet and outlet ports 56a and 56b, it is possible to equalize the cross-section of the pipe line of each of the first and fourth exhaust pipes 51a and 51d over the entire length. Further, since circular-arc recesses 57c formed in the outer surfaces of the valve walls 57A of the valve body 57 so as to face to the communication holes 56e of the valve housing 56 are continuous to the inner peripheral surfaces of the communication ports 56*d* matched to the pipe lines of the second and third exhaust pipes 51*b* and 51*c*, it is possible to equalize the cross-section of the pipe line of each of the second and third exhaust pipes 51*b* and 51*c* over the entire length. Accordingly, each of the first to fourth exhaust pipes 51*a* to 51*d* achieves an effective exhaust inertia effect and/or an effective exhaust pulsation effect by making use of the equalized cross-section thereof over the entire length. To be more specific, the effective pipe length of each of the exhaust pipes 51*a* to 51*d* becomes the maximum length extending from the engine En to the upper and lower first exhaust collection pipes 52*a* and 52*b*. The maximum effective pipe length is set such that the exhaust inertia effect and/or the exhaust pulsation effect due to the maximum pipe length enhance the volume efficiency of the engine En in the medium speed rotational range. As a result, it is possible to enhance the medium speed output performance of the engine En.

When the rotational state of the engine En is shifted to the high speed rotational range and the drive pulley 73 is driven to the second drive position "c" by the actuator 71, the drive pulley 73 exerts a large pull on the first and second transmission wires 75*a* and 75*b*. The large pull of the first transmission wire 75*a* turns the driven pulley 46 on the intake control valve 35 side in the valve opening direction over the play angle α, to bring the one end wall of the circular-arc groove 44 into contact with the transmission pin 44 of the intake control valve 35, thereby moving the valve plate 36 of the intake control valve 35 to the second intake control position B shown in FIG. 3.

Figure 12:
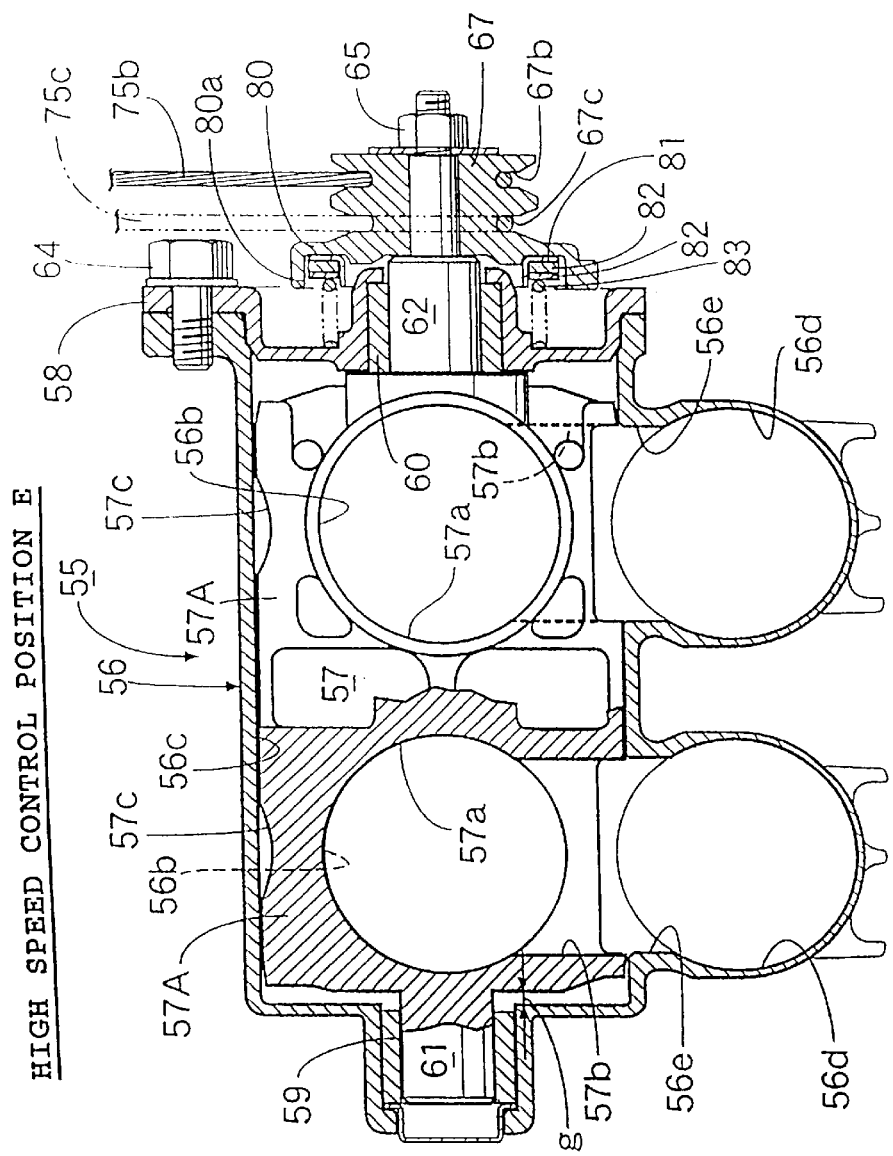
FIG. 12 is a sectional view, similar to FIG. 9, showing the exhaust control valve located at a high speed control position.

The large pull of the second transmission wire 75*b* turns the driven pulley 67 on the exhaust control valve 55 side by about 180 degrees, thereby shifting the valve body 57 from the medium control position D to the high speed control position E shown in FIG. 12, while passing through the low speed control position C.

When the valve plate 36 of the intake control valve 35 reaches the second intake control position B, as shown in FIG. 3, the valve plate 36 fully opens the large cross-section passage 33*b*, with a result that air sucked in the engine En can pass through both the large cross-section passage 33*b* and the small cross-section passage 33*a* of the air cleaner 17. Accordingly, it is possible to reduce the intake resistance, and hence to enhance the volume efficiency of the engine En and improve the high speed output performance.

When the valve body 57 of the exhaust control valve 55 reaches the high speed control position E, as described above, the through-holes 57*a* of the valve body 57 are matched to the inlet and outlet ports 56*a* and 56*b* of the valve housing 56 and the communication holes 57*b* of the valve body 57 are matched to the communication holes 56*e* of the valve housing 56, and accordingly, the exhaust gas passing states of the first to fourth exhaust pipes 51*a* to 51*d* are not changed. However, the intermediate portions of the first and fourth exhaust pipes 51*a* and 51*d* are communicated to the communication holes 56*e* and the intermediate portions of the second and third exhaust pipes 51*b* and 51*c* are communicated to the communication holes 57*b*. As a result, the effective length of each of the exhaust pipes 51*a* to 51*d* becomes the minimum length extending from the engine En to the exhaust control valve 55. The minimum effective pipe length is set such that the exhaust inertia effect and/or the exhaust pulsation effect due to the minimum pipe length enhance the volume efficiency of the engine En in the high speed rotational range. As a result, it is possible to enhance the high speed output performance of the engine En.

In the medium or high speed rotational range of the engine En, the exhaust gases having passed through the first and fourth exhaust pipes 51*a* and 51*d* are joined to each other at the upper first exhaust collection pipe 52*a*, and the joined exhaust gas flows to the second exhaust collection pipe 53, while the exhaust gases having passed through the second and third exhaust pipes 51*b* and 51*c* are joined to each other at the lower first exhaust collection pipe 52*b* and purified by the primary exhaust purifying system 84, and the joined and purified exhaust gas flows to the second exhaust collection pipe 53; and all the exhaust gases joined to each other at the second exhaust collection pipe 53 are purified by the secondary exhaust purifying system 85. Accordingly, the exhaust gases having passed through the first and fourth exhaust pipes 51*a* and 51*d* are purified only by the secondary exhaust purifying system 85.

The above-described flow pattern is efficient because the flow rate of the exhaust gases becomes relatively large in the medium or high speed operational range, so that the purifying function of the secondary exhaust purifying system 85 is sufficiently enhanced by the exhaust heat and reaction heat due to the large amount of the exhaust gases, with the result that all of the exhaust gases are effectively purified.

In this way, the functions matched to the operational state of the engine En are given to the intake system In and the exhaust system Ex, and accordingly, the output performance of the engine En can be effectively enhanced in accordance with the low speed rotational range, medium speed rotational range, and high speed rotational range.

In the case where the drive pulley 73 is returned again from the second drive position "c" to the first drive position "b" by the actuator 71, when the exhaust control valve 35 is shifted from the high speed control position E to the low speed control position C located at the intermediate point, the driven pulley 46 and the valve plate 36 of the intake control valve 35 are returned to the first intake control position A shown in FIG. 2 by the lost motion spring 45 and the return spring 41, and then the driven pulley 46 can be continuously turned within the range of the play angle α of the lost motion mechanism 42. As a result, the exhaust control valve 35 can be turned, after passing through the low speed control position C, to the medium speed control position D.

In this way, even if there is a large difference between the rotational angles of the intake control valve 35 and the exhaust control valve 55, the difference can be absorbed by the lost motion mechanism 42, with a result that both the control valves 35 and 55 can be accurately operated by the common actuator 71. In particular, the turning of the drive pulley 73 for operating the exhaust control valve 35 between the low speed control position C and the medium speed control position D is absorbed by the lost motion mechanism 42 and thereby it does not exert adverse effect on the intake control valve 35 located at the first intake control position A. As a result, the valve body 57 of the exhaust control valve 35 can be freely operated between the low speed control position C, medium speed control position D, and high speed control position E. In this way, since the actuator 71 is used commonly between both the control valves 35 and 55, it is possible to simplify the configuration of the drive system for driving both the control valves 35 and 55, and hence to improve the engine performance while reducing the cost of the drive system and further reduce the weight of the drive system.

As described above, the bearing bush 60, on the driven pulley 67 side, of the valve housing 56 of the exhaust control valve 55 not only supports one valve shaft 62 of the valve body 57, but also receives one end surface of the valve body 57 biased to the bearing bush 60 side due to a load applied to the thrust spring 83. In other words, the bearing bush 60 is pressed to the one end surface of the valve body 57 in a sealing state, so that the contact area between valve body 57 and the bearing bush 60 can be sealed to thereby prevent the leakage of the exhaust gas from the bearing bush 60 side, without use of any special seal member. The elimination of the need of provision of any seal member is effective to reduce the number of parts and to reduce the cost. In particular, the use of the bearing bush 60 made from a nonmetal material such as carbon graphite makes it possible to ensure a desirable sealing performance, and to suppress the occurrence of noise by absorbing vibration of the valve body 57 occurring in the thrust direction due to exhaust pulsation.

The present invention is not limited to the above-described embodiment, and it is to be understood that various changes in design may be made without departing from the scope of the present invention. For example, the intake control valve 35 may be configured such that the effective pipe length of the intake system In is variable depending on the operational state of the engine En. The present invention can be applied to a two-cylinder engine, wherein two exhaust pipes of the engine can be controlled by the exhaust control valve 55 like the first and fourth exhaust pipes 51a and 51d and the second and third exhaust pipes 51b and 51c. The present invention can be also applied to other multi-cylinder engines.

As described above, according to a first aspect of the present invention, there is provided intake and exhaust control systems for an engine, characterized in that an intake control valve for changing an intake mode in accordance with an operational state of an engine is provided in an intake system of the engine and an exhaust control valve for changing an exhaust mode in accordance with an operational state of the engine is provided in an exhaust system of the engine; and the intake control valve and the exhaust control valve are driven by a common actuator. Accordingly, it is possible to effectively obtain a desired output performance of the engine irrespective of a change in operational state of the engine by operating the intake control valve and the exhaust control valve in accordance with the operational state of the engine by the actuator. Further, since the intake control valve and the exhaust control valve are driven by the common single actuator, it is possible to simplify the configuration of the drive system and hence to improve the engine performance and reduce the cost of the drive system, and also to reduce the weight of the drive system.

According to the second aspect of the present invention, the intake control valve is operated between a first intake control position at which the intake control valve gives a low speed side compatible function to the intake system and a second intake control position at which the intake control valve gives a high speed side compatible function to the intake system; and the exhaust control valve is operated between a first exhaust control position at which the exhaust control valve gives a low speed side compatible function to the exhaust system and a second exhaust control position at which the exhaust control valve gives a high speed side compatible function to the exhaust system. Accordingly, it is possible to enhance the output performance in a wide operational region of the engine from the low speed operational range to the high speed rotational range by operation of the intake control valve between the first and second intake control positions, and operation of the exhaust control valve between the first and second exhaust control positions.

According to the third aspect of the present invention, a lost motion mechanism for absorbing a difference in operational amount between the intake control valve and the exhaust control valve is provided between the actuator and the intake control valve or between the actuator and the exhaust control valve, and accordingly, even if there is a large difference between the operational amounts of the intake control valve and the exhaust control valve, both the control valves can be operated by the common actuator.

According to the fourth aspect of the present invention, an exhaust control system includes an exhaust control valve, the exhaust control valve including a common valve housing interposed on the way of a first exhaust pipe and a second exhaust pipe connected to cylinders different in ignition timing and a valve body mounted in the valve housing and switchably turned between a low speed control position, a medium speed control position, and a high speed control position, wherein at the low speed control position of the valve body, the first exhaust pipe is communicated to the second exhaust pipe and the first exhaust pipe is closed on the downstream side of the communicated portion; at the medium speed control position, the first exhaust pipe and the second exhaust pipe individually allow exhaust gases to pass therethrough; and at the high speed control position, the first exhaust pipe and the second exhaust pipe individually allow exhaust gases to pass therethrough, and an intermediate portion of the first exhaust pipe is communicated to an intermediate portion of the second exhaust pipe. Accordingly, the output performance in each operational range can be improved by controlling the valve body at the low speed, medium speed, or high speed control position in accordance with the low speed, medium speed, or high speed operational range of the engine, thereby increasing the back pressure of the engine or changing the effective pipe length of each exhaust pipe.

According to the fifth aspect of the present invention, the valve body is supported in the valve housing so as to be turned between the low speed control position, the medium speed control position, and the high speed control position, and the valve body has a through-hole crossing the axial line of the valve body and a communication hole for opening one side surface of the through-hole in the radial direction of the valve body; and at the low speed control position of the valve body, the communication hole and the through-hole are concerned with the mutual communication of the first exhaust pipe and the second exhaust pipe, and a valve wall, opposed to the communication hole, of the valve body is concerned with the closing of the downstream side of the first exhaust pipe; at the medium control position, the through-hole is matched to the pipe line of the first exhaust pipe, and the valve wall is concerned with the blocking between the first exhaust pipe and the second exhaust pipe; and at the high speed control position, the through-hole is matched to the pipe line of the first exhaust pipe, and the communication hole is concerned to the communication between the first exhaust pipe and the second exhaust pipe. Accordingly, it is possible to equalize the cross-section of the pipe line of each exhaust pipe over the effective pipe length matched to each operational range of the engine irrespective of the presence of the valve body, and hence to obtain effective exhaust inertia effect and/or exhaust pulsation effect matched to each operational range. In particular, when the valve body is controlled at the medium speed control position, it is possible to equalize the cross-section of the pipe line of each exhaust pipe over the entire length, and hence to significantly obtain the above-described effect and improve the medium speed output performance of the engine.

According to the sixth aspect of the present invention, of the first exhaust pipe and the second exhaust pipe on the downstream side from the valve housing, only the second exhaust pipe is connected to a primary exhaust purifying system; the first exhaust pipe and the second exhaust pipe are connected to an exhaust collection pipe on the downstream side from the primary exhaust purifying system; and a secondary exhaust purifying system is provided in the exhaust collection pipe. Accordingly, in the low speed operational range of the engine in which the flow rate of exhaust gas is relatively small, the valve body is controlled at the low speed control position. In this case, all of the exhaust gas having passed through the valve housing can be sequentially introduced to the primary and secondary purifying systems, to thereby purify the exhaust gas; the primary exhaust purifying system can be heated to an activation temperature at an early stage; and the entire cost of the exhaust purifying systems can be reduced because any exhaust purifying system is not provided on the first exhaust pipe side. Further, in the medium or high speed operational range of the engine, the valve body is controlled at the medium or high speed control position. In this case, the exhaust gas having passed through the first exhaust pipe does not pass through the primary exhaust purifying system; however, in such a state, the flow rate of the exhaust gas becomes relatively large and all of the amount of the exhaust gas passes through the secondary exhaust purifying system, so that the purifying function of the secondary exhaust purifying system is sufficiently enhanced by the exhaust heat of the large amount of the exhaust gas and the reaction heat and thereby all of the exhaust gas can be effectively purified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An exhaust control system for an engine, the exhaust control system comprising:
    an exhaust control valve having a valve housing, the valve housing being operably connectable to first and second exhaust pipes; and
    a valve body, the valve body being selectively movable between a low speed control position, a medium speed control position, and a high speed control position,
    wherein at the low speed control position, the first exhaust pipe is in communication with the second exhaust pipe at a communication location in said valve body, and the first exhaust pipe is closed at a downstream side of the communication location.

2. The exhaust control system of claim 1, wherein:
    at the medium speed control position, the first exhaust pipe and the second exhaust pipe each allow gases to pass therethrough; and
    at the high speed control position, the first exhaust pipe and the second exhaust pipe each allow gases to pass therethrough, and an intermediate portion of the first exhaust pipe is in communication with an intermediate portion of the second exhaust pipe.

3. An exhaust control system for an engine, the exhaust control system comprising:
    an exhaust control valve having a valve housing, the valve housing being operably connectable to first and second exhaust pipes; and
    a valve body, the valve body being selectively movable between a low speed control position, a medium speed control position, and a high speed control position,
    wherein the valve body includes a through-hole crossing an axis of said valve body, and a communication hole for opening one side surface of said through-hole in a radial direction of said valve body; and
    at the low speed control position, the communication hole and the through-hole allow mutual communication of the first exhaust pipe and the second exhaust pipe, and a valve wall opposed to the communication hole of said valve body allows the closing of a downstream side of said first exhaust pipe;
    at the medium speed control position, the through-hole is at least substantially aligned with an axis of the first exhaust pipe, and the valve wall provides a block between the first exhaust pipe and the second exhaust pipe; and
    at the high speed control position, the through-hole is at least substantially aligned with the axis of the first exhaust pipe, and the communication hole allows communication between the first exhaust pipe and the second exhaust pipe.

4. An exhaust control system for an engine, the exhaust control system comprising:
    an exhaust control valve having a valve housing, the valve housing being operably connectable to first and second exhaust pipes; and
    a valve body, the valve body being selectively movable between a low speed control position, a medium speed control position, and a high speed control position,
    wherein the first exhaust pipe and the second exhaust pipe extend to a downstream side from said valve housing, only the second exhaust pipe being in communication with a primary exhaust purifying system;
    wherein the first exhaust pipe and the second exhaust pipe are connected to an exhaust collection pipe on a downstream side of the primary exhaust purifying system; and
    wherein a secondary exhaust purifying system is disposed in the exhaust collection pipe.

5. An exhaust system comprising:
    a plurality of exhaust pipes, the exhaust pipes being operably connectable with cylinders for receiving exhaust gases from the cylinders;
    an exhaust control valve, the exhaust control valve being operably connected with the plurality of exhaust pipes for receiving exhaust gases from the exhaust pipes;
    a first exhaust collection pipe operably connected to the exhaust control valve on a downstream side of the exhaust control valve;
    a second exhaust collection pipe operably connected to the exhaust control valve on a downstream side of the exhaust control valve;
    a first exhaust purifying device disposed within the first exhaust collection pipe; and
    a second exhaust purifying device disposed within an exhaust passageway downstream of a point at which the first exhaust collection pipe and the second exhaust collection pipe are in communication with one another, the flow from both the first exhaust collection pipe and the second exhaust collection pipe being receivable by the exhaust passageway.

6. The exhaust system of claim 5, wherein the plurality of exhaust pipes comprises first, second, third, and fourth exhaust pipes.

7. An exhaust control system for an engine, the exhaust control system comprising:
    an exhaust control valve having a valve housing, the valve housing being operably connectable to first and second exhaust pipes; and a valve body, the valve body being selectively movable between a low speed control position, a medium speed control position, and a high speed control position, wherein the valve body includes a through-hole crossing an axis of said valve body, and a communication hole for opening one side surface of said through-hole in a radial direction of said valve body; and at the low speed control position, the communication hole and the through-hole allow mutual communication of the first exhaust pipe and the second exhaust pipe, and a valve wall opposed to the communication hole of said valve body allows the closing of a downstream side of said first exhaust pipe.

8. The exhaust control system of claim 7, wherein the valve body is rotatably supported in the valve housing, the valve body being rotatable between the low speed control position, the medium speed control position, and the high speed control position.

* * * * *